United States Patent
Lau et al.

(10) Patent No.: US 10,255,164 B2
(45) Date of Patent: Apr. 9, 2019

(54) TRANSACTION STITCHING DEFINITIONS

(71) Applicant: CA, Inc., Islandia, NY (US)

(72) Inventors: Rich J. Lau, Deer Park, NY (US); Rui Zhong Zhou, Little Neck, NY (US)

(73) Assignee: CA, Inc., Islandia, NY (US)

( * ) Notice: Subject to any disclaimer, the term of this patent is extended or adjusted under 35 U.S.C. 154(b) by 15 days.

(21) Appl. No.: 15/087,102

(22) Filed: Mar. 31, 2016

(65) Prior Publication Data
US 2017/0286274 A1 Oct. 5, 2017

(51) Int. Cl.
*G06F 9/44* (2018.01)
*G06F 11/36* (2006.01)

(52) U.S. Cl.
CPC ...... *G06F 11/3668* (2013.01); *G06F 11/3684* (2013.01)

(58) Field of Classification Search
CPC .................................................. G06F 11/3684
See application file for complete search history.

(56) References Cited

U.S. PATENT DOCUMENTS

| | | | |
|---|---|---|---|
| 8,984,490 B1 * | 3/2015 | Dahan | G06F 11/3006 709/223 |
| 9,111,019 B2 | 7/2015 | Michelsen et al. | |
| 2011/0087722 A1 * | 4/2011 | Clementi | G06F 11/3006 709/202 |
| 2015/0205709 A1 | 7/2015 | Michelsen et al. | |
| 2016/0140023 A1 | 5/2016 | Michelsen et al. | |

* cited by examiner

*Primary Examiner* — Hang Pan
(74) *Attorney, Agent, or Firm* — Alliance IP, LLC

(57) ABSTRACT

Transaction data is accessed that describes a plurality of transactions and includes a plurality of frames, with each frame describing a respective portion of a corresponding one of the plurality of transactions. A user-defined stitching definition is accessed that is related to a particular one of the plurality of transactions. Correlations between respective transaction portions described in the plurality of transaction frames are determined with a particular correlation between first and second transaction portions determined based on the user-defined stitching definition. A transaction path of the particular transaction is determined based at least in part on the particular correlation determined between the first and second transaction portions. The particular transaction includes the first and second transaction portions and the first transaction portion is determined to immediately precede the second transaction portion in the transaction path of the particular transaction based on the determined particular correlation.

18 Claims, 12 Drawing Sheets

TRANSACTION STITCHING DEFINITIONS

BACKGROUND

The present disclosure relates in general to the field of computer software development tools, and more specifically, to facilitating a shared software development environment.

Software development can involve a variety of tools to support a development life cycle of an application or system. The development cycle can include activities such as system design, development, integration and testing, deployment, maintenance, and evaluation. As software systems become more complex, such as in service-oriented architectures linking multiple traditional systems (from potentially multiple different software vendors) other development cycles and strategies are emerging, including waterfall, spiral, Agile development, rapid prototyping, incremental, and synchronize and stabilize. In the case of Agile methodologies, the focus can be on lightweight processes which allow for rapid and iterative changes within the development cycle. Further complicating the tasks and management of development activities within modern software development is the reality that multiple developers often collaborate to build and perform development tasks involving a single system. Indeed, software development can be challenged by complex multi-tiered, distributed architectures in which a particular software component is to be developed or particular functionality is to be tested, among other example issues.

BRIEF SUMMARY

According to one aspect of the present disclosure, transaction data describing a plurality of monitored transactions can be accessed that includes a plurality of frames, with each frame describing a respective portion of a corresponding one of the plurality of transactions. A user-defined stitching definition can be accessed that is related to a particular one of the plurality of transactions. Correlations between respective transaction portions described in the plurality of transaction frames are determined based on corresponding attributes of the transaction portions, and a particular correlation can be determined between a first transaction portion and a second transaction portion based on the user-defined stitching definition. The first and second transaction portions can be further be determined to be portions of the particular transactions. A transaction path of the particular transaction can be determined based at least in part on the particular correlation determined between the first and second transaction portions. The first transaction portion can be determined to immediately precede the second transaction portion in the transaction path of the particular transaction based on the determined particular correlation.

BRIEF DESCRIPTION OF THE DRAWINGS

Like reference numbers and designations in the various drawings indicate like elements.

DETAILED DESCRIPTION

Figure 1:
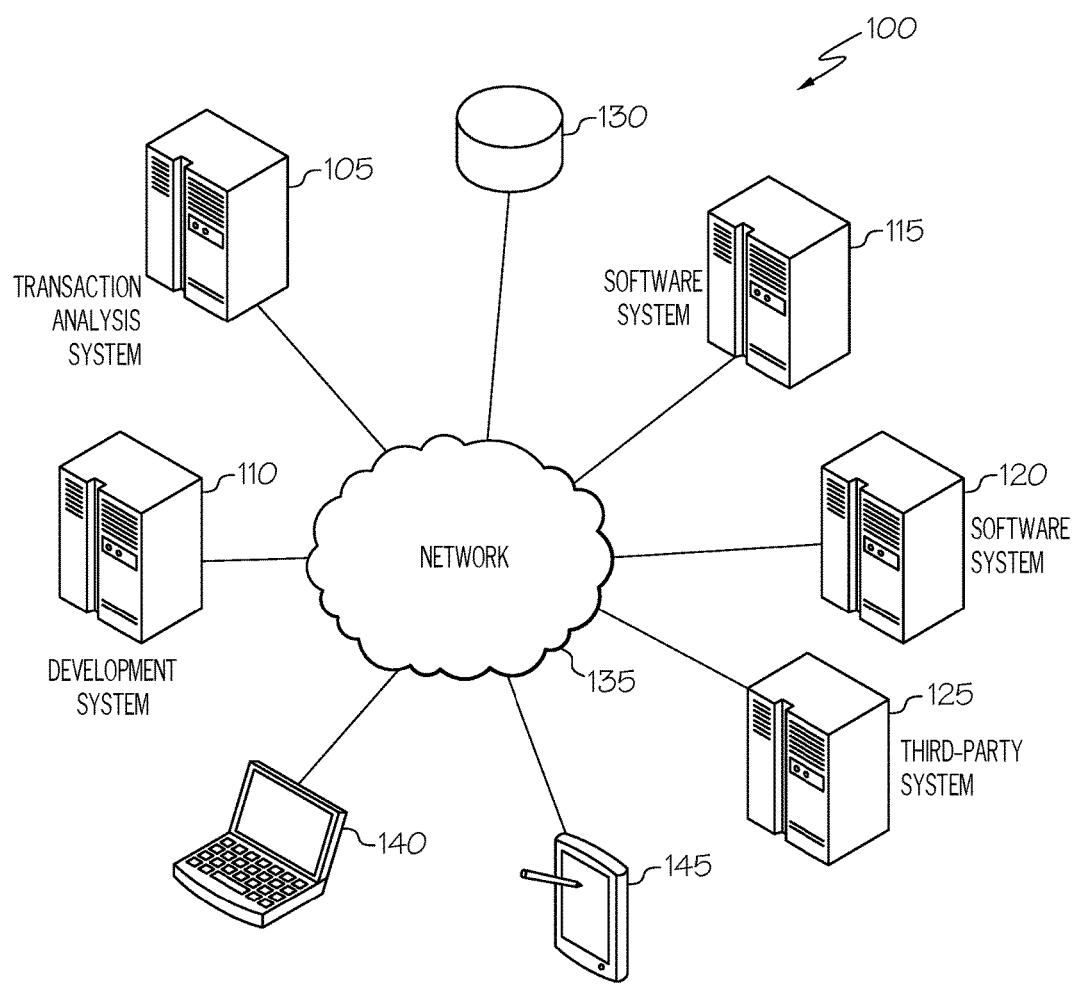
FIG. 1 is a simplified schematic diagram of an example computing system including a transaction analysis system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing system 100 including a transaction analysis system 105 and software development system 110, among other hardware and software computing systems. In some implementations, functionality of the transaction analysis service system 105, development system 110, and other systems and tools can be combined or even further divided and implemented among multiple different systems. For instance, the software development system 110 can be provided with tools for use in the development cycle of a software program, such as a program, or application, hosted on one or more software systems (e.g., 115, 120, 125). Development tools can be provided or supported by the development system 110 such as a profiler tool, a logging tool, a debugger, a source control tool for managing proposed software patches and updates, a software virtualization system, among other examples. In some instances, tools provided by the development system 110 can be hosted on multiple different systems. In other cases, a combination of development tools of the development system 110 can be hosted as a suite of tools on a single system, among other example implementations.

A transaction analysis system 105 can include functionality for determining the flow paths of the various transactions that may take place between components in a single application or across multiple applications. Transaction paths determined by the transaction analysis system 105 can be used to assist developers (e.g., using development system 110) in visualizing how software components interact, visualizing and developing based on dependencies between software components, and generating tests based on various transactions. In some cases, a transaction analysis system 105 may interface with one or more development tools provided by development system 110 to enhance operation of these tools or the development system generally. As an example, the transaction analysis system 105 can detect the software components and transaction fragments included within a given transaction that is to be tested, profiled, debugged, virtualized, or otherwise utilized by developers. In some examples, development tools can be conditionally deployed on certain transactions, and transaction analysis system 105 can be used to detect transaction or session boundaries in which a particular development activity is to be performed based on transaction data collected from software-based agents deployed throughout a multi-component software system. This transaction data can be further utilized to observe how software transactions proceed, or flow, through the system.

At least some of software systems (e.g., 115, 120) can host software that is the subject of development activities performed using tools of development system 110 and analysis conducted using transaction analysis system 105. This software can be an application, program, or portion (collectively referred to herein as "component") of a larger, multi-tiered software system. Software components can utilize, consume data and services of, provide data or services to, or otherwise be at least partially dependent on or function in association with one or more other software components hosted on the same (e.g., 115) or a different software server system (e.g., 120, 125). Software components in the system can be hosted on systems (e.g., 115, 120) of a single entity or may be distributed on systems (e.g., 125) controlled by one or more third parties, among other examples. Further, software components in some software systems can interact with and consume data from and/or contribute data to one or more data services or data stores, such as database 130, among other examples. Transactions involving any one or a combination of these various applications and their respective sub-systems, or components, can be monitored and assessed to determine flows within and between the systems.

One or more computing systems and services can be hosted on machines communicatively coupled by one or more networks (e.g., 135), including local networks, public networks, wide area networks, broadband cellular networks, the Internet, and the like. Systems with which a system under development (e.g., 115) can interact can include data stores (e.g., 130), other software systems (e.g., 120, 125), and constituent software components accessible over the one or more networks 135. Further, systems and services (e.g., 105, 110, etc.) provided to support development of the one or more of systems (e.g., hosted on 115, 120, 125, 130, etc.) can also be provided local to or remote from (e.g., over network 135) the target systems (e.g., 115, 120, 125, 130), among other examples. Additionally, computing environment 100 can include one or more user devices (e.g., 140, 145) that can allow users to interact with one or more of the servers, services, data structures, and services (e.g., 105, 110, 115, 120, 125, 130, etc.) provided in the environment. Such user interactions can take place locally at the host systems of such software components or remotely over network 135, using user devices (e.g., 140, 145).

In general, "servers," "clients," "computing devices," "network elements," "hosts," "system-type system entities," "user devices," and "systems" (e.g., 105, 110, 115, 120, 125, 130, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 130, 140, 145, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a development system 110, transaction analysis system 105, server system (e.g., 115) or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, sub-system, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

A transaction analysis system 105 can manage monitoring of mammoth amounts of transactions in a system, which may include the involvement a wide array of applications and software components. Transaction data generated through this monitoring may identify request-response pairs, or transaction fragments, exchanged between two software components in a transaction. Indeed, multiple instances of an interaction between two particular software components or even multiple instances of the same transaction may be observed during the monitoring. It can be difficult to determine which transaction fragments instances belong to which transaction instances. The transaction analysis system 105 can provide robust stitching logic to determine relationships between transaction fragments and determine which transaction fragments belong to which transaction instances, and how the transaction fragments are ordered within each transaction fragment. This stitching logic, however, may not be capable of identifying relationships for all transaction fragments and transactions however in all systems. For instance, the architecture or unique nature of some transaction provided by a particular system may make it difficult or even impossible for the transaction analysis system 105 to determine a transaction flow for a particular transaction or grouping of identified transaction fragments. In such instances, customer support teams, relating to the transaction analysis system 105 may be called upon to develop one-off work arounds or extensions to enable transaction path determinations for such customer systems. However, such work may often require man hours of expert engineering teams, putting a burden on the usability of the transaction analysis system and those relying upon it for their own activities and business (e.g., a software development team developing software components for use in the customer system).

Figure 2:
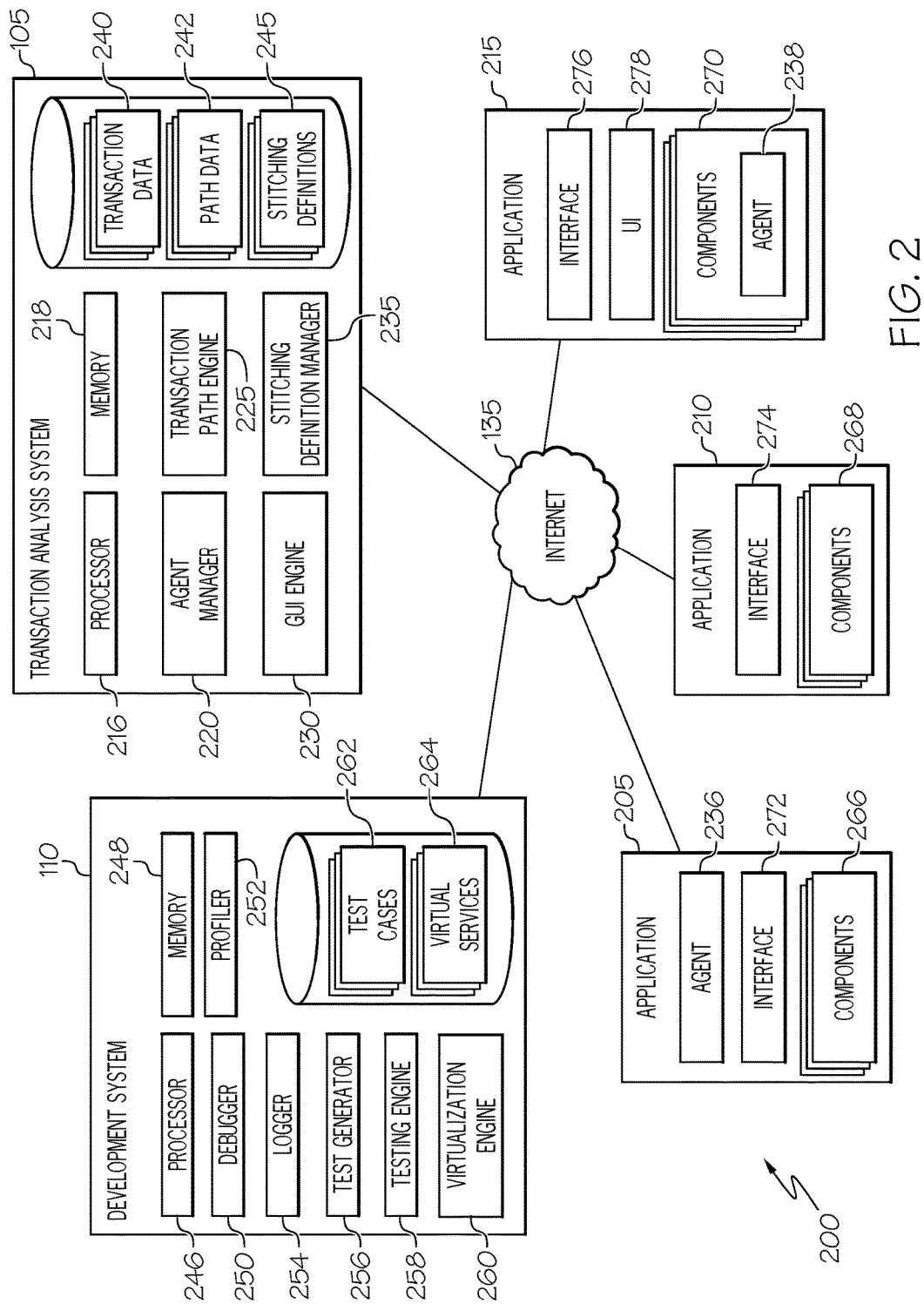
FIG. 2 is a simplified block diagram of an example computing system including a transaction analysis system and development system in accordance with at least one embodiment.

At least some of the systems described in the present disclosure, such as the systems of FIGS. 1 and 2, can include functionality that at least partially remedy or otherwise address at least some of the above-discussed example deficiencies and issues, among others. For instance, a transaction analysis system 105 can be enhanced to provide an option for users to custom-define stitching definitions to be considered by the transaction analysis system 105 to identify correlations between requests and/or responses within disparate transaction fragments or transaction data, whereupon transaction path determinations can be made for one or more transactions. Such user-defined stitching definitions can be used as an exception to standard, core, or default stitching logic utilized and provided by the transaction analysis system 105 and designed to be applied to most systems and transactions that might be monitored in connection with the transaction analysis system.

Turning to the example of FIG. 2, a simplified block diagram 200 is shown illustrating an example environment 200 including a transaction analysis system 105, a development system 110, and one or more services, database management systems, programs, or applications (referred to in this example collectively as "applications" (e.g., 205, 210, 215). The systems 105, 110, 205, 210, 215, etc. can interact, for instance, over one or more networks 135. In one example, a transaction analysis system 105 can include one or more data processors 216, one or more memory elements 218, and various components (implemented in software, firmware, and/or hardware) such as an agent manager 220, transaction path engine 225, GUI engine 230, and stitching definition manager 235, among other components or implementations.

In one example, an agent manager 220 can be used to aggregate or generate transaction data 240 generated from monitoring of a plurality of transactions involving a plurality of software components (e.g., 266, 268, 270) hosted by potentially multiple applications or server systems (e.g., 205, 210, 215). Transaction data 240 can, in turn, be used by the transaction path engine 225 to determine flow paths for each of the transactions. Determined transaction flow paths can be described in path data 242 generated by the transaction path engine 225, which can be used by a GUI engine 230 or tools of a development system 110 to assist developer users. In some cases, a transaction path engine 225 can utilize user-defined stitching definitions 245 (generated and managed using stitching definition manager 235) to determine transaction paths from the transaction data, among other features.

In some implementations, an agent manager 220 can generate transaction data from information received from various instrumentation agents (e.g., 236, 238) or other monitors (collectively "agents") deployed in a system to monitor communications between components and operation of the components within the system. In some cases, agents (e.g., 236, 238) may themselves generate transaction data and agent manager 220 may receive or otherwise access the transaction data 240 to aggregate for use by other tools (e.g., 225, 230) of the transaction analysis system. In one implementation, agent manager 220 may interface with agents (e.g., 258, 264) deployed on one or more applications (e.g., 205, 215) or "on the wire" between components (or applications) for use in aiding the monitoring of performance of various components (e.g., 266, 270) and transactions within a system. In some cases, a single agent (e.g., 236) can monitor operation of and transactions involving more than one software component and in other cases each software component (e.g., 270) can be instrumented with a respective agents (e.g., 238). Some agents (e.g., 236, 238) can be software-implemented agents that are configured to provide visibility into the internal operations of each instrumented component (e.g., 266, 270, etc.) as well as the data being communicated into and out of each component. Each agent can be configured, for example, to detect requests and responses being sent to and from the component or application in which that agent is embedded. Each agent (e.g., 236, 238) can be configured to generate information about the detected requests and/or responses and to report that information to other services and tools, such as agent manager 220, transaction path engine 225, and one or more development tools of development system 110, etc. Additionally, each agent can be configured to detect and report on activity that occurs internal to the component in which the instrumentation agent is embedded. Collectively, such information can be embodied as transaction data generated by the agents (e.g., 236, 238) to report characteristics of the components' operation and transaction observed by the respective agent. Transaction data from an agent can be marked to identify the agent from which it originates.

In response to detecting a request, response, and/or other activity of a transaction to be monitored, each agent (e.g., 236, 238) can be configured to detect one or more characteristics associated with that activity and/or the monitoring of that activity by the agent. The characteristics can include a frame identifier, which identifies a message, with respect to the agent, sent by the agent to a managing service, such as agent manager 220, embodying at least a portion of the transaction data sent from the agent to report the characteristics observed by the agent. For instance, frames can include a parent identifier, which identifies the requester software component that generated the request sent to the component or sub-component monitored by the instrumentation agent; a transaction identifier, identifying the transaction, with respect to the component or sub-component being monitored, such as transactions between components carried out through communications and calls made over one or more network connections; a session identifier (or token) to propagate session information detected in one portion of the transaction throughout the transaction; and an agent identifier that identifies the agent, with respect to the other instrumentation agents in the testing system, that is generating the characteristics, among other characteristics. Such characteristics can include other information such as a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, method invocations (such as Enterprise Java Beans (EJB) method invocations), entity lifecycle events (such as EJB entity lifecycle events), heap sizing, identification of network connections involved in transactions, identification of messages and data exchanged between components, including the amount of such data, and the like. Characteristics can also include the thread name of a thread processing the request to generate the response and other data describing threads involved in a transaction, the class name of the class of an object invoked to process the request to generate the response, a Web Service signature used to contain the request and/or response, arguments provided as part of the request and/or response, an ordinal (e.g., relating to an order within a transaction), the duration of time spent processing the request and/or generating the response, state information, a local Internet Protocol (IP) address, a local port, a remote IP address, a remote port, and the like, among other examples.

As the above examples indicate, characteristic information can include information generated by the agent itself and information generated and/or processed by the component or sub-component monitored (and collected) by the agent (such as data sent or received by the component that intercepted by one or more agents). The agent can then cause information identifying those characteristics to be provided to one or more other services or tools (e.g., development tools of development system 110) communicatively coupled to the agent or agent manager. In some embodiments, each instrumentation agent collects information to form a message, also referred to herein as a frame, which describes characteristics associated with either or both a detected request and a detected response to the request in a transaction. In some instances, an agent can return transaction data in a frame to describe both the request and its corresponding response as observed at a software component monitored by the agent. In such cases, the respective agent can wait for the response corresponding to the request to be generated and sent before sending the frame to another tool or engine (e.g., 220, 225) making use of the information in the frame.

In some embodiments, all or some of agents (e.g., 236, 238) can be configured to perform interception and/or inspection (e.g., using the Java™ Virtual Machine Tool Interface, or JVM TI). Such an instrumentation agent can register with the appropriate application programming agent (API) associated with the component or process being monitored in order to be notified when entry and/or exit points occur. This allows the agent to detect requests and responses, as well as the characteristics of those requests and responses. In particular, this functionality can allow an agent to detect when a component begins reading and/or writing from and/or to a socket, to track how much data is accessed (e.g., read or written), obtain a copy of the data so read or written, and generate timing information (as well as information describing any other desired characteristics such as inbound/read or outbound/write identifiers) describing the time or order at which the data was read or written, among other information describing the data accessed, processed, or generated by the component.

In some instances, agents (e.g., 236, 238) can be configured to monitor individual threads by monitoring the storage used by each thread (i.e., the thread local storage for that thread), variable values utilized in the thread, functions called in the thread, among other information. Such agents can detect when the monitored thread begins reading or writing to a thread local variable in the thread local storage. In response to detecting this access to the thread local variable, the agent can track the amount (e.g., in bytes, as tracked by incrementing a counter) of data that has been accessed, as well as the starting offset within the thread local storage to which the access takes place. In response to detecting that the thread's access to the thread local variable has ended, the instrumentation agent can use the information about the access to identify characteristics such as the time of the access, the variable being accessed, the value being accessed, network calls being made, and the like. Agents can likewise identify and focus monitoring on specific processes and other quanta of software components and their execution (i.e., other than or in addition to threads).

In some implementations, agents (e.g., 236, 238) can be implemented by inserting a few lines of code into the software component (or the application server associated with that software component) being instrumented. Such code can be inserted into a servlet filter, SOAP filter, a web service handler, an EJB3 method call, a call to a Java Database Connectivity (JDBC) handler, and the like. For example, an agent configured to monitor an EJB can be configured as an EJB3 entity listener (e.g., to monitor entity beans) or interceptor (e.g., to monitor session beans, etc.). Some components (or their corresponding application servers) may not provide users with the ability to modify their code, and thus some instrumentation agents can be implemented externally to the component being monitored in a manner that can cause all requests and responses being sent to and/or from that component to be handled by the corresponding agent(s). For example, for an existing database, an agent can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver. For example, in one embodiment, the identity of the "real" driver for the database can be embedded in the uniform resource locator (URL) that is passed to the instrumentation driver. In this way, the instrumentation driver can intercept all calls to the database, detect characteristics of those calls, pass the calls to the appropriate database, detect characteristics of the corresponding responses, and then return the characteristics of those calls and responses within corresponding transaction data 240, among other examples.

In implementations utilizing one or more agent managers (e.g., 220), multiple agents (e.g., 236, 238) can communicate with single agent manager 220 via a messaging system. In some cases, agents monitoring components hosted on distinct, or remote, devices can communicate over one or more networks with one or more centralized, or semi-centralized, agent managers 220. In one example implementation, agents (e.g., 236, 238) can communicate with an agent manager 220 using a messaging system such as Java™ Message Service (JMS), among other examples. For instance, agent manager 220 can create a messaging system topic for each transaction (referred to herein as a transaction frame (TF) topic) and subscribe to that TF topic. The instrumentation agents, upon startup, can broadcast their existence to each other and/or to agent manager 220. The agents (e.g., 236, 238) can then get the TF topic from agent manager 220 and begin publishing messages onto a message bus on that TF topic. Agent manager 220 can monitor the published messages and determine whether those messages relate to the current TF topic. As needed, agent manager 220 creates new TF topics for new transactions. In other examples, agents (e.g., 236, 238) can alternatively communicate with agent manager 220 using techniques other than those involving messaging systems. For example, agents can write information to shared data repository (e.g., a database associated with the test system) using database commands, and an agent manager 220 can monitor those database commands to detect new information, among other examples.

Additionally, agents can monitor and report characteristics independently for each transaction in which its respective monitored component(s) (e.g., 266, 270, etc.) participates. In some cases, an agent can send transaction data for each fragment of a transaction observed by the agent. For instance, separate frames can be sent for the request and corresponding response. An agent manager 220 can receive frames containing the transaction data and provide this transaction data for further processing and analysis (e.g., by transaction path engine 225). Transaction data 240 can describe a wealth of information and transaction and software component characteristics as captured by the agents (e.g., 236, 238). This information can be used, for instance, by the transaction path engine 225 to sort transaction data and determine correlations between transaction data and the transaction fragments (request and responses) described in the transaction data. From these correlations, the transaction path engine 225 can determine which transaction data describes which transaction instances and can further determine relationships between the transaction fragments of a transaction, including the order of the transaction fragments within an overall flow path of the transaction traverses multiple software components of the system (and potentially multiple agent domains).

Stitching logic of the transaction path engine 225 can attempt to identify correlations between transaction data frames and corresponding transaction fragments on the basis of values of characteristics captured by the agents (e.g., 236, 238) during monitoring. For instance, one of the characteristics that can be collected by agents (e.g., 236, 238) can include timing information, such as a timestamp, that indicates when a particular request was received or when a particular response was generated. Such timing information can be included in transaction data 240 and be used, for instance, by transaction path engine 225, to identify that frames, including frames received from different agents, are related to the same transaction. In some implementations, timers used by agents (e.g., 236, 238) can be synchronized to assist in correlating timing information collected between multiple agents. Additionally or alternatively, flow, organization, hierarchy, or timing of a particular transaction can be identified through the generation of transaction identifiers that include characteristics collected by agents (e.g., 236, 238) for use in identifying fragments of the transaction. Such transaction identifiers, or transaction fragment identifiers, can include data collected by instrumentation agents in connection with, for example, the exchange of data, messaging, and other communications between components in the transaction, from thread jumps identified within software processes involved in the transaction, and other features of the transaction or fragments of the transaction.

Stitching can consider alternate or additional characteristic information identified from monitoring of requests and responses between components as they progress through one or more transactions. For example, transaction data 240 can describe characteristic information associated with requests in the transaction (e.g., the time at which the request was received, the sender of that request, the time at which corresponding requests were sent to a database and/or other service, etc., whether the request is associated with a session, how much data was exchanged, the identity of the communication channel used in the request or response, and the like) and the same or other transaction 240 frames can describe similar characteristics of a request's corresponding response. Correlations between these characteristics can be identified by the transaction path engine 225 and serve as the basis for determining a flow path of a transaction.

As noted above, a transaction path engine 225 can determine and track the specific path, or flow, taken by a given transaction based on transaction data 240 captured and reported by agents observing the transaction at the participating software components. The path can be determined as the transaction progresses in substantially real time, with some transaction data being returned as some transaction fragments complete (but before others finish or begin). The transaction path engine 225 can access and utilize transaction information in transaction data 240 to identify fragments of a transaction and organize transaction fragments and accompanying information describing characteristics of the fragment of a particular transaction into groups corresponding to a common transaction. For instance, transaction fragment characteristics can be correlated to group corresponding frames into groups of frames that describe a complete transaction or session (that includes multiple transactions).

In some embodiments, in order to group frames, or otherwise identify relationships between frames or transaction fragments, transaction path engine 225 (or another tool) can sort the frames based upon particular characteristics, such as timing information associated with and/or included within those frames, the presence of a common session token included in the reported transaction data frames, parent and child component identifiers, the size of requests sent/received, among other information. After being sorted, the frames can be arranged in ascending or descending order, with respect to the timing or parent-child information, etc. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing information.

In other examples, frames can be sorted, for example, based on an amount of data exchanged, the identity of a particular communication channel or network connection used, addresses of the receiving and sending components, the identification of the particular agents that provided the frames, etc. For instance, frames and accompanying transaction fragments can be correlated according to the amount and type of data that was received and/or generated, as detected by the agent, as well as information identifying the components or sub-components involved in the monitored activity. For example, such identity information can include information identifying the network ports (e.g., of the requester and responder), IP addresses, network information, or other features describing the communication of a request and corresponding response between a requester and responder. This information can be used to correlate or otherwise identify relationships between two different frames that have similar timing information and data amounts, for example. Identified network connections can be mapped to a particular portion, or fragment, of a transaction, and such fragments can be grouped (e.g., using the collected network connection description data) to identify particular transactions involving multiple different software components (and network connections), among other examples.

After sorting transaction data frames and related transaction fragments, a transaction path engine 225 can then group the frames into transactions. In one embodiment, this can involve identifying correlations between transaction attribute values detected in the monitored transactions. Correlations can be based on default stitching criteria finding correlations in attribute values such as time stamp value, the address(es) of the requesting and/or receiving software component in a transaction fragment (e.g., expressed as an IP address, URL, port number, etc.), content of one or more header fields, session identifiers, the size of a payload included in a request or response, among other example attributes. As an example, transaction data can indicate information including the network ports (e.g., of the requester and responder) used to communicate a request and corresponding response between a requester and responder, the size of a payload in a response, and time stamp data of the request and response. This information can be used to correlate two different frames that have similar timing information and data amounts, and involve the same pair of requesting and responding port numbers, as an example. For instance, a request sent by a first software component can be described in transaction data that was approximately 2 Kbytes and sent at a timestamp 09:42:01. Another frame can describe the reception of a request by a second software component from the first software component that was also approximately 2 Kbytes in size and arrived at timestamp 9:42:55. A transaction path engine 225 can determine a correlation between these two pieces of transaction data and determine that they describe different views of the same transaction fragment.

Sorting and grouping of frames can be attempted using default stitching logic of a transaction path engine 225 operable to detect correlations on the basis of a standardized set of attributes (e.g., header field values, timestamp values, payload sizes, software component addresses, etc.). In some cases, certain transaction fragments may not lend themselves well to sorting or grouping according to such attributes. For instance, sorting may not be possible for particular specialized transactions or transactions within particularly complex system architectures. For instance, the presence of a load balancer or other routing process between two software components in a transaction may result in a re-addressing of requests and/or responses that may not be identifiable from the monitoring and jeopardize stitching on the basis of standardized criteria (e.g., on the basis of determining a correlation between consistent addresses in requests and responses). Indeed, applying default stitching logic in some unique transactions or systems may result in incorrect groupings or no groupings using the default stitching logic. Accordingly, user-defined stitching definitions 245 can be defined for such transactions and the user-defined stitching definitions can supersede (or be considered together with) the default stitching criteria by defining specialized criteria or specific parent-child relationships for use in determining correlations between a certain subset of the transaction fragments. For instance, the transaction path engine 225 can search for correlations based on criteria defined in one or more user-defined stitching definitions (e.g., 245) among a collection of transaction fragments (or just those transaction fragments believed to be associated with a corresponding specialized transactions) and use these correlations as the basis for sorting and grouping corresponding transaction fragments as well as correlations based on the default stitching criteria and logic of the transaction path engine 225.

Regardless of whether the transaction path engine 225 utilizes default or user-defined stitching criteria (or even a combination of both) to determine correlations between transaction fragments and corresponding transaction data 240, the transaction path engine 225 can order, or stitch, the frames to define a chain or order of transaction fragments within a given transaction or set of instances of a similar transaction. The stitching of the frames can be based on the determined correlations between grouped frames (e.g., to identify parent-child relationships between given frames and their corresponding transaction fragments). The stitched frames can then define a transaction flow to allow the path, or flow, of the transaction to be followed from the start of the transaction to the end of the transaction and across a chain of potentially many different software components. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated by the agents. In one embodiment, the frame identifiers can be generated from information identifying the IP address (or other addressing information) and port number used by the monitored component or sub-component, the amount of data sent or received by the monitored component during the monitored activity, and/or the instrumentation agent itself, among other information. Relationships can thereby be identified between parent frames, transaction fragments, and software components and corresponding child frames, transaction fragments, and components, to stitch these frames together, among other examples. Attributes of one transaction fragment can be imputed to other transaction fragments and/or a transaction as a whole based on the determined relationships between corresponding frames describing the component fragments of a transaction.

In addition to being able to use relationships or correlations to predict or determine a stitching or flow path of transaction fragments, transaction path engine 230, in some instances can use the lack of correlative data reported by an agent to determine that a given frame corresponds to a transaction fragment that represents a root or leaf (e.g., beginning or end) of a particular transaction or branch of a transaction. For instance, it can be identified that no related connections (or other transaction fragments) involving a particular software component (or just a single correlation) have been identified or reported and conclude, predictively, that the lack of further connections or other reporting data relating to the component or a flow including the component indicate that the transaction terminated at the component, among other examples. Similarly, root nodes can be predictively determined based on the absence of frames documenting an inbound connection at a particular component from which other transaction fragments (and related connections) originate, among other examples. Root nodes can be considered to represent the furthest "upstream" component in a flow, while leaf nodes represent the further "downstream" components in the flow.

The transaction path engine 225 can generate and maintain path data 242 describing the determined flow paths involving one or more software components (e.g., 266, 268, 270) or one or more software systems or applications (e.g., 205, 210, 215). Other tools, as well as other systems, can consume path data 242 to perform additional activities and services in support of tests and development of software systems (e.g., 205, 210, 215) described in the paths. For instance, graphical representations of the transaction paths can be generated from the path data to illustrate the involvement of a set of software components and how the transaction progressed through the set of software components. Additionally, the graphical representation can present representations of characteristics defined in the transaction information (e.g., characteristics of requests and responses in individual transaction fragments, characteristics of individual software components, etc.).

In one example implementation, a GUI engine 230 can access path data 242 (and/or transaction data 240) to generate a graphical representation of a transaction flow path determined for a transaction by the transaction path engine 225. The graphical representation can represent a transaction flow in a manner similar to the representations illustrated in the flowcharts of FIGS. 3-4E below. For instance, graphical block elements can be determined and presented for each software component participating within the transaction. In some cases, the block elements can be formatted according to the type of the software component (e.g., SOAP element, JavaBean, database, etc.) to quickly highlight to the user the general nature of the software components involved in the transaction. Further, each transaction fragment within the transaction can be represented by a respective graphical line that connects the two corresponding software components involved in the request and response of the transaction fragment. Further, based on the ordering of the transaction fragments within the determined transaction flow path, the graphical blocks and lines can be arranged in a series or tree to represent the progression or flow of the transaction path as it begins with an initial request (and transaction fragment), progresses across various software components and downstream transaction fragments, and ultimately ends with a response to the initial request, among other examples.

The graphical representation of a transaction flow generated by the GUI engine 230 can be an interactive presentation. For instance, users may interact with the graphical representation through a user interface, for instance, by selecting the individual graphical elements (e.g., blocks representing software components or lines representing transaction fragments) to cause additional details to be presented concerning the transaction element represented by the selected graphical element. Such details can include attribute values described in transaction data describing the corresponding transaction fragment or participation of the software component observed during monitoring of the system. In some instances, a user can manipulate the presentation to re-order or add/change attributes of the originally observed transaction. As an example, the graphical presentation can be presented in connection with the creation of a test case that is based on a determined transaction flow and is operable to initiate another instances of the same transaction (e.g., in connection with a test of a system). The transaction flow can be considered in the test case and used as a baselines from which test instances of the same transaction can be compared (e.g., to verify correct operation of a system). The test case or test case baseline can be edited, in some implementations, through user manipulation of the presented graphical representation of the transaction flow. Such test cases and graphical test case editing can utilize principles described, for instance, in U.S. Pat. No. 9,111,019, incorporated by reference herein.

As noted above, transaction flow information can be utilized in connection with development activities performed, for instance, using development tools of an example development system (e.g., 110). In one example implementation, a development system 110 can include one or more processor devices (e.g., 246) and one or more memory elements (e.g., 248) for use in executing one or more components, tools, or modules, or engines, such as a debugger 250, profiler 252, logger 254, test generator 256, testing engine 258, and virtualization engine 260, among other potential tools and components including combinations or further compartmentalization of the foregoing. In some implementations, development system 110 can be implemented as multiple different distinct systems including, for example, varying combinations of the foregoing components and tools (e.g., 250, 252, 254, 256, 258, 260, etc.) and accompanying data (e.g., 262, 264).

As noted above, transaction path information can be used in connection with tests of a software system. Development tools, such as a test generator 256 can utilize transaction path data to generate test cases (e.g., 262), such introduced in examples described above. A testing engine 258 can utilize these test cases 262 to orchestrate and launch test transactions within a system and monitor performance of the system during these test transactions. In such test transactions, virtual services 264 can be launched, which virtualize operation of one or more downstream components that are to generate responses within the test transactions. The virtual services 264 can generate synthetic responses simulating operation of the software component(s) they model, allowing the virtual services 264 to stand-in for the corresponding real world components that are inaccessible or otherwise undesirable to involve in the test transaction. Transaction path information can be utilized to determine which downstream components are (or are likely) to be invoked in the test transaction to allow the same to be virtualized using corresponding virtual services (e.g., generated and launched using virtualization engine 260).

Transaction data 240 and transaction path data 242 can also be used to determine that one or more boundary conditions to identify where a particular transaction begins and ends. For instance, various development tasks and tools can be deployed conditionally or only on certain transactions or transaction instances. Transaction path information can be used to determine the boundaries of a particular transaction on which a particular development activity (e.g., debugging (using debugger 250), profiling (using profiler 252), logging (using logger 254), etc.) is to be performed, among other example uses.

As noted above, software systems and their constituent software components can include functionality for transacting with one or more other systems and components in a multi-tiered system. In some cases, software components can transact with other components over one or more networks (e.g., 135) (using corresponding network ports, sockets, etc.), APIs, or other interfaces (e.g., 272, 274, 276), among other examples. Some applications can include frontend, user-facing services and applications that further include user interfaces (e.g., 278) for presenting at least some of the outputs and results of a transaction to a user. Such user interfaces can further accept one or more inputs or request values provided by a user, among other examples. Applications, software systems, and software components can perform any variety of tasks or services and be implemented using potentially any suitable programming language, architecture, and format.

Figure 3:
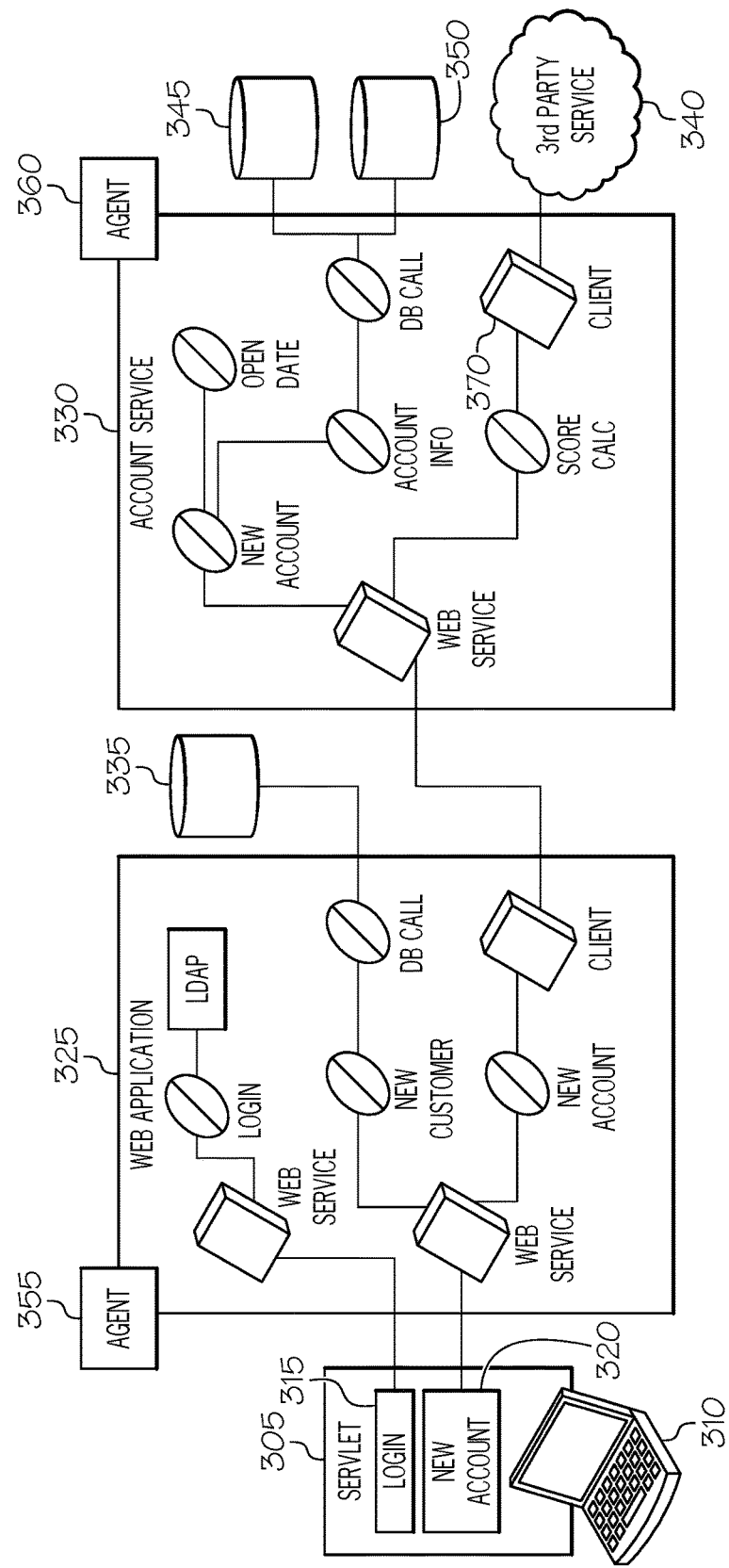
FIG. 3 is a simplified block diagram of an example system in accordance with at least one embodiment.

Turning to FIG. 3, a simplified block diagram is shown representing, for purposes of illustrating certain principles of this disclosure, an example software system and composite software components capable of engaging in one or more transactions. It should be appreciated that this particular system (and the transactions in this example) represents but a single example, and that a potentially unlimited variety of alternative systems, transactions, and architectures may make be monitored, analyzed, have defined transaction boundaries, and otherwise utilize the general features and principles outlined herein.

In the particular example of FIG. 3, a servlet component 305 is provided as a front end for an example Login transaction 315 and New Account transaction 320 accessible to users of user computer devices (e.g., 310). The Login transaction can involve calling a web service of a web application 325 and use of a Login software component (e.g., implemented in this particular example as JavaBean software components) and Lightweight Directory Access Protocol (LDAP) system to facilitate the logging-in of a user into an account of the web application 325. The web application 325 can potentially interact with multiple different users in multiple different concurrent session. Accordingly, the web application 325 can also maintain session identifiers, cookies, or other data to track sessions with the users. Other components of the system (e.g., backend service 330), however, may not maintain session or maintain different session data that abstracts the identity of the original requester (e.g., user), among other examples.

Figure 4A:
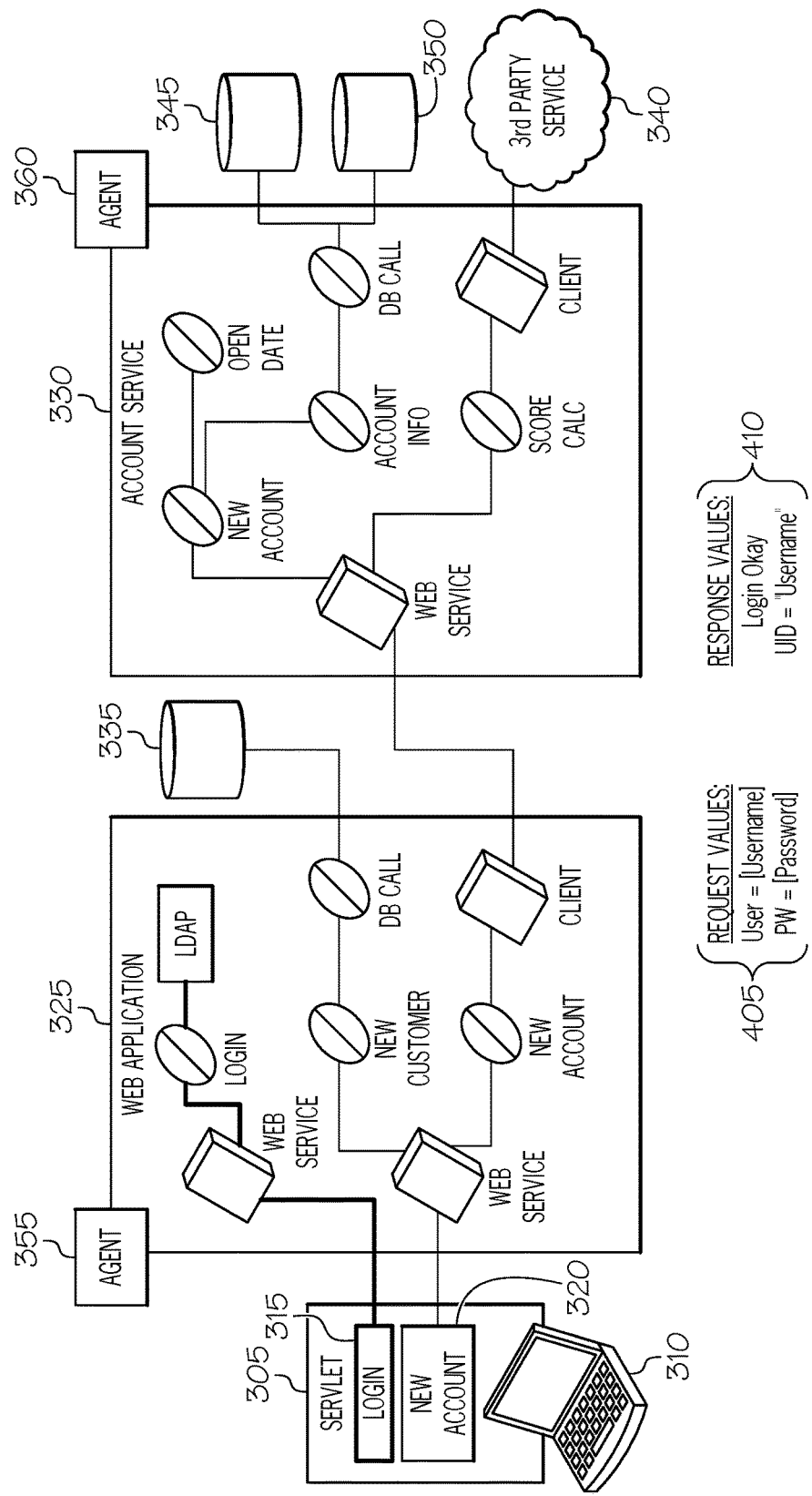
FIGS. 4A-4E are simplified block diagrams illustrating transaction flow paths in various implementations of an example system in accordance with at least some embodiments.

FIG. 4A illustrates the flow path of an example Login transaction 315 as well as example request values 405 of the Login transaction together with example response values 410 returned in the transaction in response to the request values 405. For instance, Login transaction can include a user-provided username and password pair (provided through servlet 305) resulting in a Login Okay response value when the provided username-password pair matches the username-password pair of an existing account managed by the LDAP system of web application 325. Further, the identity of the username can also be returned, for instance, in a welcome message identifying the username.

Figure 4B:
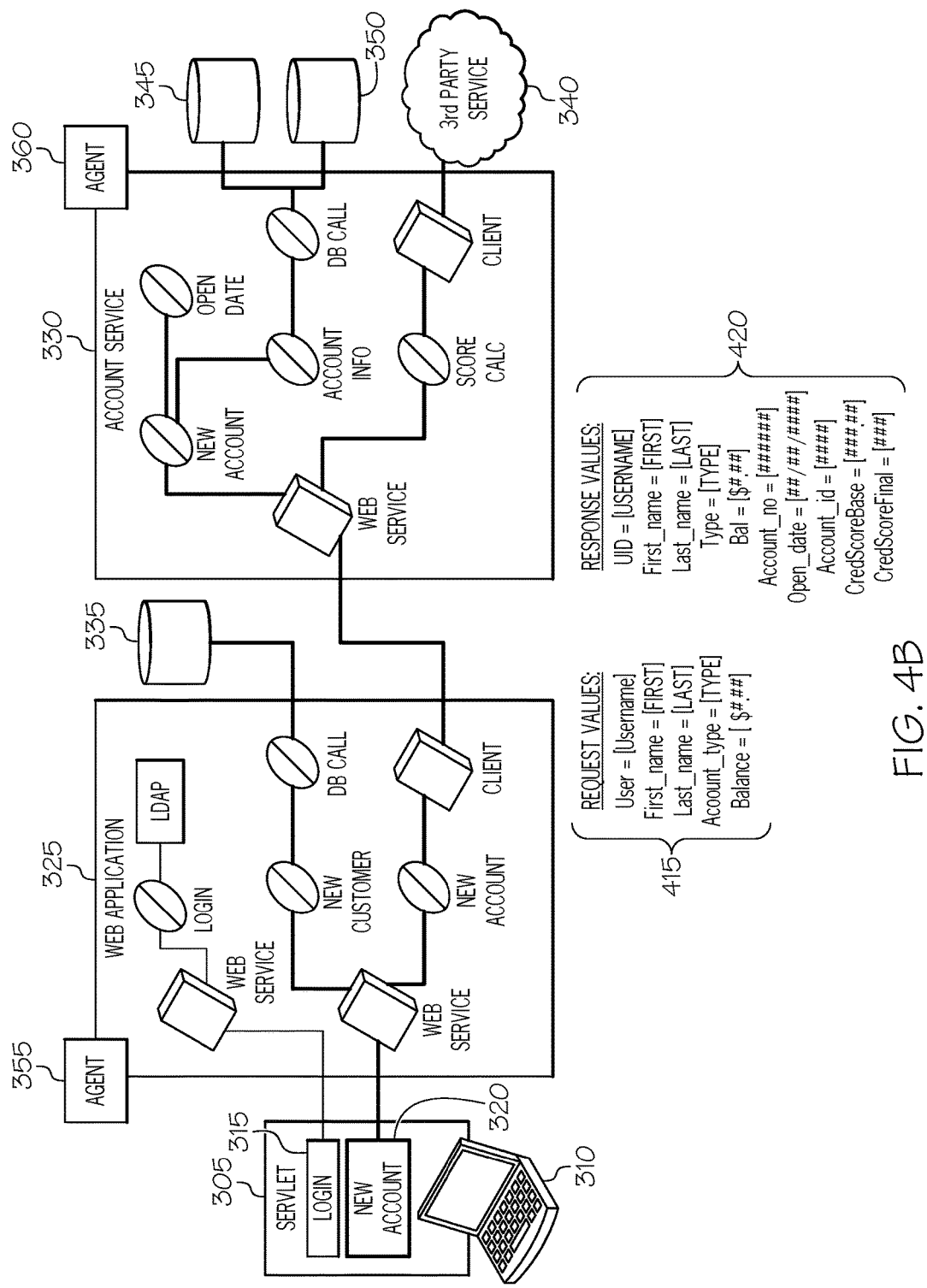

Returning to FIG. 3, additional transactions can be provided and identified. For instance, the New Account transaction 325 can support the creation and storage of a new account, such as an account for an ecommerce, banking, media subscription, or other application or service. For instance, as shown in the example of FIG. 4B, a more complex flow path can be identified for the New Account transaction 325 including multiple branches in the flow path. For example, upon creation of a new account (using New Account transaction 325) corresponding account information can be entered into a database 335 maintained outside of web application 325 and account service 330. The account information can be generated by one or more software components, such as by software components of account service 330, database 345, third party service 340, or other services and entities. New Account transaction can accept inputs or request values 415, such as username, first name, last name, account type, and account balance (e.g., for a loan, bank, e-payment, or other financial account). These request values 415, when processed in the transaction, can cause the retrieval, generation, and return of response values 420 including response values (such as values corresponding to user ID, first name, last name, account type, and balance) that are at least partially dependent or predictable based on values of the request values 415, as well as additional response values (such as values of an account number, account open date, account ID, credit score, etc.) that are not derived from or based on any of the request values 415. Such response values (e.g., account number, account open date, account ID, credit score) that are at least partially independent of request values 415 of the transaction can be considered dynamic values that are not easily derivable or predicted from the request values 415.

The flow paths of each respective transaction involving a particular software component or system can be represented in transaction path data generated, for instance, using a transaction path engine. Transaction path data can be generated by grouping and correlating transaction fragment information included in transaction data and/or agent data captured and generated by one or more agents 355, 360 deployed on the software components and/or systems involved in the transactions, as illustrated in the example of FIG. 3. Some software components, such as third party service 340, may be unmanaged in that they are not instrumented with agents under the control of or otherwise accessible to a transaction path engine, test engine, or other tool or entity monitoring the transaction. The involvement and functionality of such unmanaged software components may remain unknown to the tools utilized in the development of transaction paths and tests of a particular transaction, and can be effectively regarded as a black box within the transaction that accepts certain monitored requests and returns corresponding responses captured, in some instances, by the agent (e.g., 360) of a neighboring monitored software component (e.g., SOAP client 370) receiving the response value from the unmonitored component (e.g., third party service 340), among other examples.

Figure 4C:
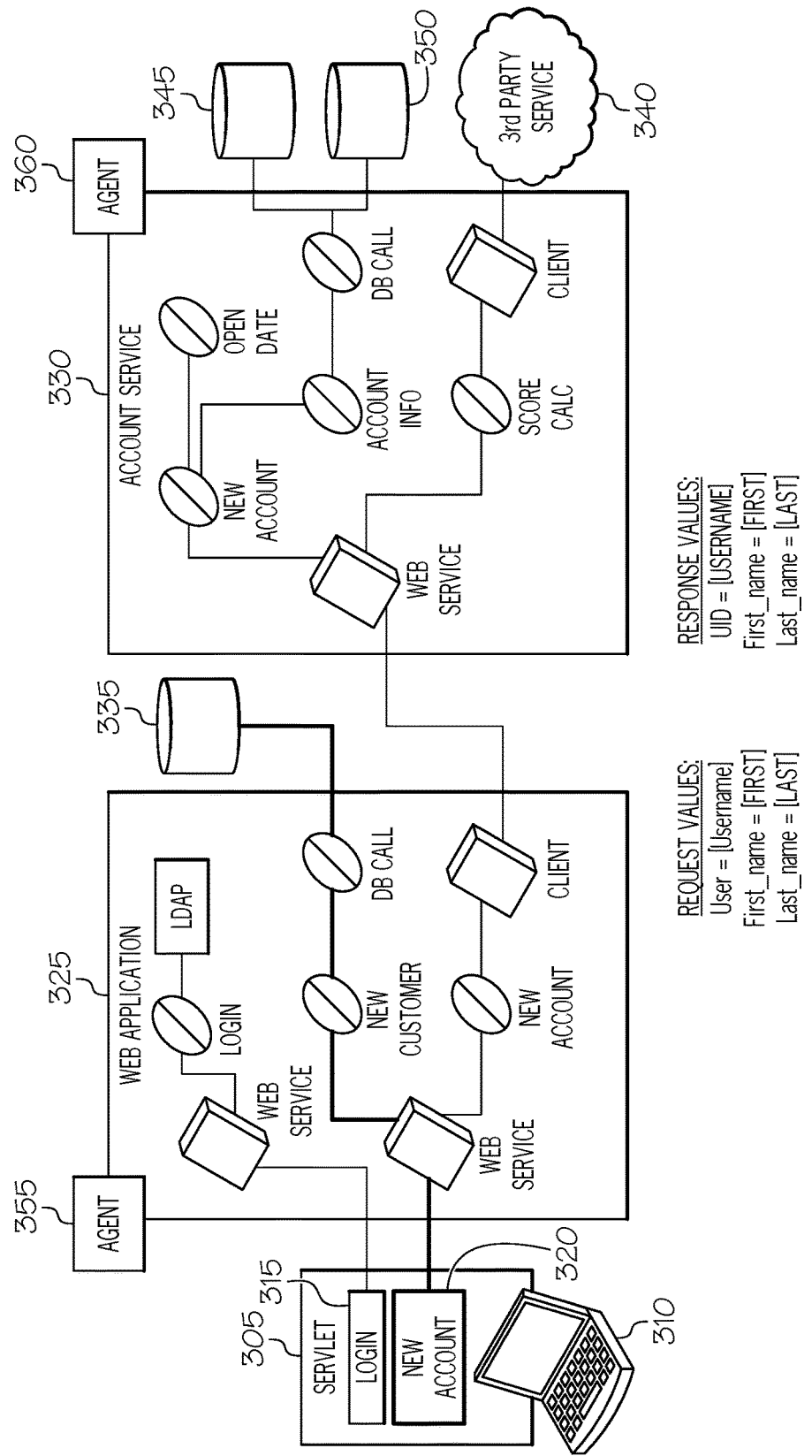

In some implementations, a single transaction can include the generation, communication, and use of multiple different response values. The generation and processing of various data within a transaction can involve the transmission of request values and response values to multiple different software components along multiple different sub-paths, or branches, of the transaction flow path. For example, FIG. 4C shows an example of a first branch of a transaction flow path shown bolded in FIG. 4B. The flow path branch of FIG. 4C shows a path for generating and storing a response value in database 335. For example, a response value can be generated or communicated by a New Customer software component for a new customer record utilizing other account information generated in the transaction. Response values such as UID, First name, and Last name may be provided from or generated by a New Customer software component or from a database call of database 335, among other examples. The actual values of UID, First name, and Last name, in some examples, can be obtained from request values provided by a user, such as the request values User, First name, and Last name. In some examples, proper operation of the New Customer software component may be evidenced by the generation of response values UID, First name, and Last name that echo request values User, First name, and Last name, among other examples.

Figure 4D:
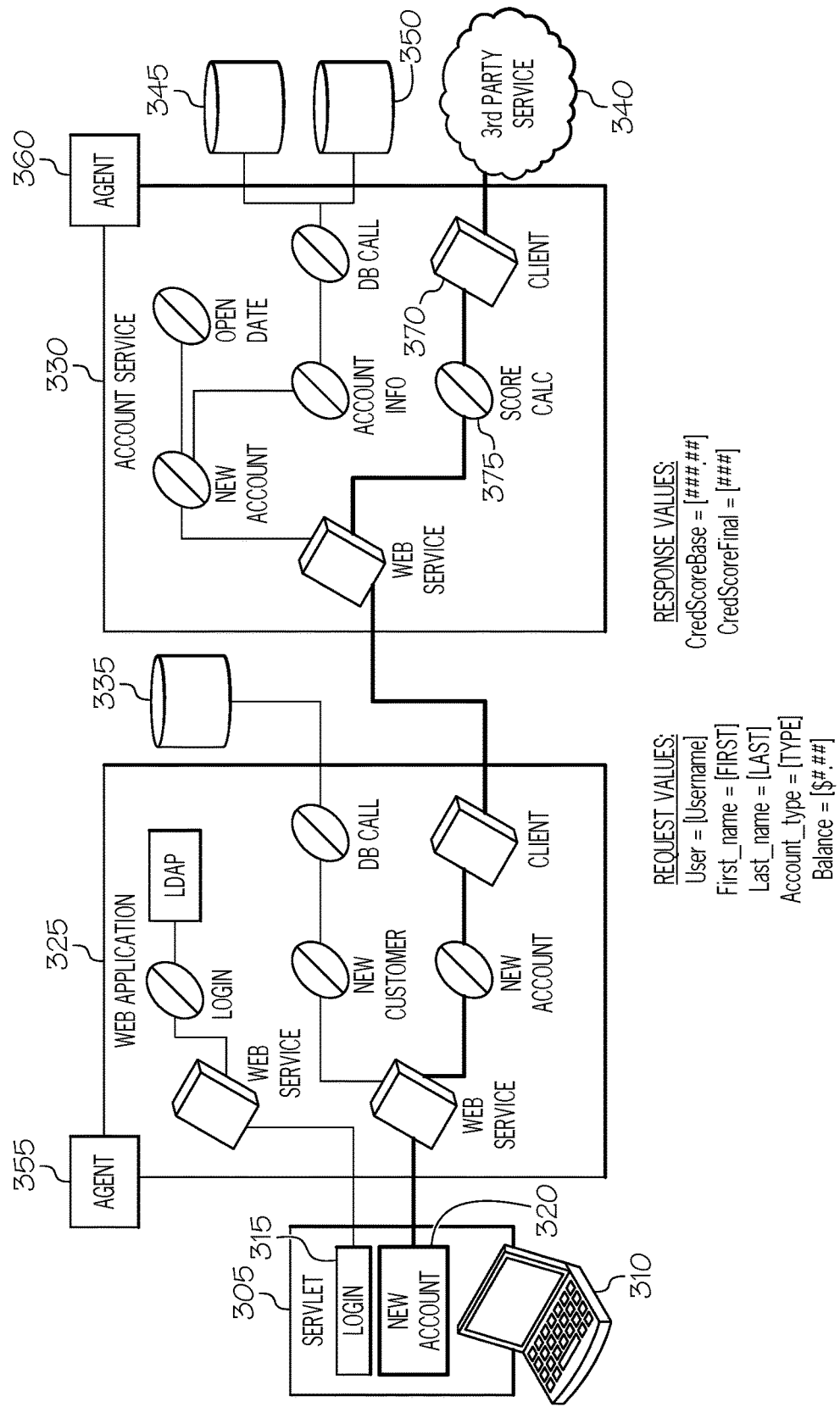

As another example, FIG. 4D illustrates another branch of an example New Account transaction, such as the New Account transaction introduced in the example of FIG. 4B. Credit score information (e.g., CredScoreBase, CredScoreFinal) can be one of the response values returned in connection with the New Account transaction and can involve transaction fragments calling upon a third-party service 340, such as a credit score reporting service to obtain a CredScoreBase values. In this example, service 340 may be unmanaged, in that no agent is deployed on the service 340 to generate and communicate transaction information for use by a transaction analysis system. However, transaction data collected or generated by agents 355, 360 can be processed to create transaction path data that can be analyzed to identify that a CredScoreBase value is returned from a third party service 340 (e.g., to client component 370 of account service 330) and that the CredScoreBase value is utilized by a Score Calc software component 375 to generate a CredScoreFinal value. Accordingly, an analysis of the corresponding transaction path data can result in the identification of the third party service 340 as the source of the CredScoreBase value and the Score Calc component 375 of the account service 330 as the source of the CredScoreFinal value. As the third party service 340, in this example, is unmanaged, agents 355, 360 used to monitor the transaction are left without intelligence regarding how the CredScoreBase value is generated within the third party service 340, whether other external services are called in connection with the generation of the CredScoreBase value by the third party service 340, and so on. The agent 360 can, however, identify attributes of the response (including its content (and the CredScoreBase value)) as received from the third-party service 340 and can describe these attributes in corresponding transaction data. As the agent 360 has visibility into the internal operation of account service 330, the agent 360 can directly monitor the Score Calc component 375 and can identify with precision that the CredScoreFinal value was generated by the Score Calc component based on a CredScoreBase value returned from the unmanaged third party service 340.

As illustrated in the example of FIG. 4D, although some components (e.g., 340) may not be instrumented with an agent (e.g., 355, 360) information concerning the transaction fragments in which such components participate (e.g., 335, 340, 345, 350, etc.) can nonetheless be obtained as managed components interact with unmanaged components. For instance, although database 345 may not be monitored by an agent, in some implementations, a transaction path engine or other tool can recognize certain types of calls to external components, such as SQL database calls, inverted list database calls, virtual storage access method (VSAM) calls, indexed sequential access method (ISAM) calls, flat file queries, and cache database calls, among other examples. Through such types of calls, the transaction path engine can make certain assumptions about the nature and operation of the external component. For instance, a SQL call to component 345 can be identified by an agent 350 and interpreted to conclude that component 345 is a database and the source of the value returned in response to the SQL call, among other examples. For instance, other types of calls can be used to implicitly identify the general character of a software component generating or returning a particular value in a transaction.

In one example implementation, through transaction flow data (e.g., 245) generated by the transaction path engine 230, the nature of a particular response value and its dependency on one or more request values can be identified. For instance, transaction data can be correlated from consecutive transaction fragments and identify, for instance, from clock or timing data, or through a comparison of data included in requests and responses, that a particular response value corresponds to a particular request value. Additionally, characteristics detected at one component in a set of software components involved in a transaction flow (or a particular thread in the transaction flow) can be attributed to other components (and/or threads running on the components) based on determining that the components and/or threads are included in the same transaction flow. For instance, a session identifier detected by an agent (e.g., 355) during a session involving a request of web application 325 by a particular user can identify that the session pertains to the particular user. Using transaction data, downstream threads (e.g., from agents 355, 360), such as running on account service 330, can be determined to be within the same transaction or session causing these downstream threads to also be associated with the particular user (e.g., even when the downstream software component (e.g., 330)) is unaware of the particular user's involvement in the session. In the example of FIGS. 3-4D, the particular user may be a user different from the "user" identified in [Username], [FIRST], [LAST], etc. For instance, the user may correspond to a developer who performs an instance of the Login or New Account transactions in connection with testing or development of the software system illustrated in FIG. 3 (e.g., using test values for [Username], [FIRST], [LAST], etc., among other examples Linking together a set of distinct (and potentially disparate) transactions, transaction fragments, threads, software components, etc. on the basis of user session using agent-generated transaction data and determined transaction flows can be a powerful tool to support filtering development activities. For instance, development activities on a shared software system or component can be filtered on the basis of individual developer users (or particular groups of developer users). For example, a developer-user can initiate a session in connection with a particular development activity. The user session may not explicitly identify the developer-user, but because the user session originates from the developer-user, the session can be identified as associated with the developer-user. In one example, at least one of the software components utilized in the session may be session-aware and an agent instrumented on this software component can identify that the transaction, or session, is a session to be associated with the particular developer-user. The agent and/or agent manager can tag transaction data describing transaction fragments in this session (as observed at this software component) with a token or other identifier to indicate that the transaction fragment is to be associated with the particular developer-user. For instance, an agent can possess logic to identify the type of session identifier (e.g., session token, cookie, etc.) used by the software components or application it is monitoring, allowing the agent to detect the presence of the cookie and tag corresponding transaction data (and even outbound requests) with a tag identifying the session, among other examples. Subsequent transactions in the session, as observed at this software component can be likewise identified. Further, through stitching (e.g., the determination that one transaction fragment is related to an immediately subsequent or previous transaction fragment in a transaction flow, can cause subsequent and/or previous transaction fragments to be likewise tagged as included in the user session and associated with the particular developer-user. This can be useful, for instance, when at least some portions of the software system are shared and potentially multiple different users (and user sessions) are on-going during the particular developer-user's session and use of the shared software system.

Figure 4E:
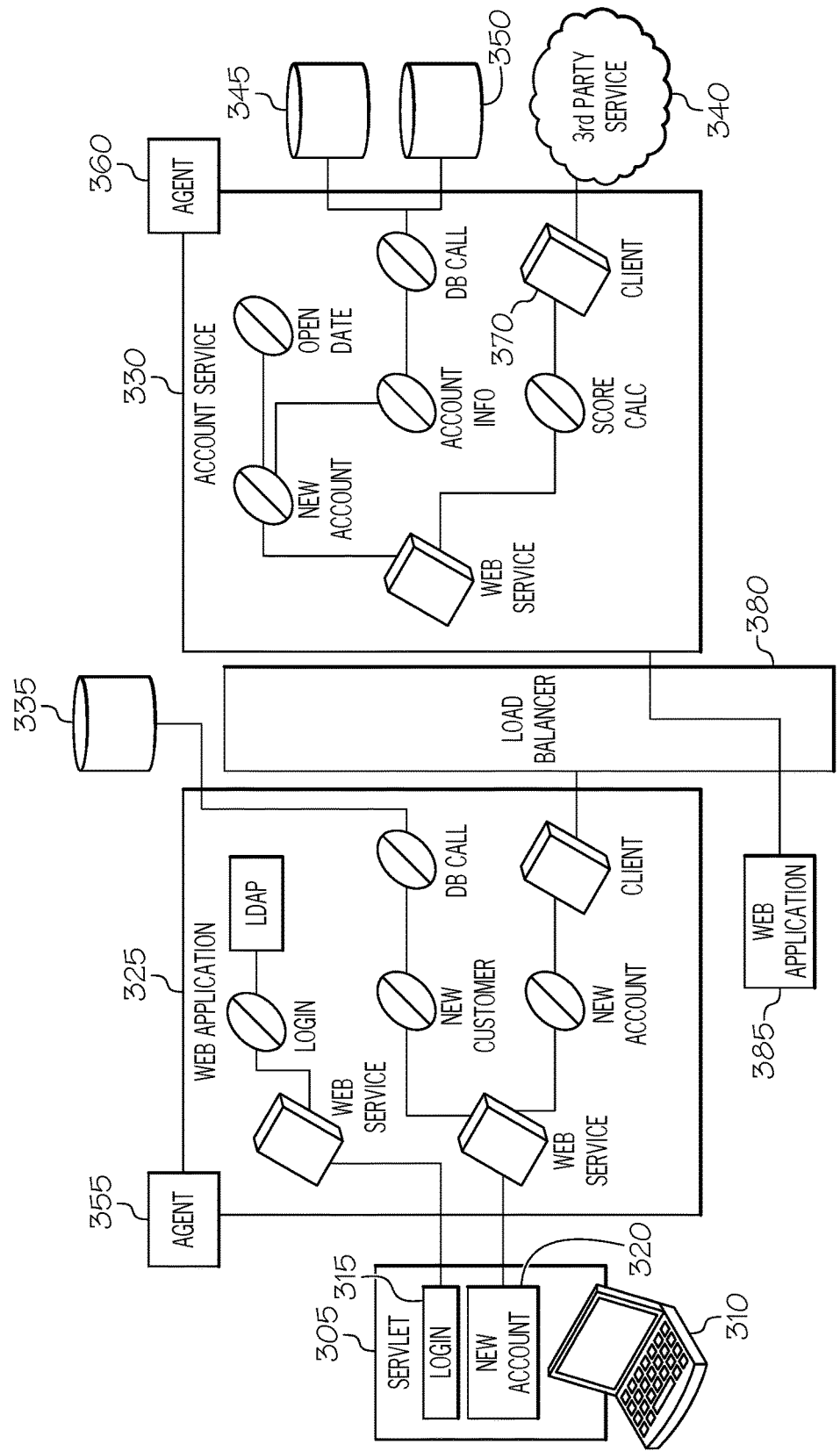

Turning to FIG. 4E, other architectural complexities of a system may additionally complicate the determination of flow paths of transactions monitored within a system. As an example, the example of FIG. 4E shows an alternative implementation of the example system of FIGS. 3-4D, with a load balancer 380 provisioned between multiple instances of a web application (e.g., 325, 385) and one or more instances of account service 330, among other example implementations. In implementations such as this, requests sent over an intermediate routing process (or other process or system), such as load balancer 380, may possess values, such as destination or source address values, transaction or session identifiers, etc. that may be changed by the intermediate process (e.g., 380). For instance, a request from web application 325 may be sent in one form to the load balancer 380 for routing to the account service 330 and emerge on the other side of load balancer 380 in a different form (e.g., with one or more request header fields or other content of the request having been changed in connection with operations and processing (e.g., routing) by the intermediate process 380. Such changes may then make it impossible to correlate the version of the request observed by agent 355 as being sent by the web application 325 with the version of the same request observed by agent 360 as being received by account service 330 (via load balancer 380) and determine a corresponding transaction flow for the transaction that included the request. Responses sent between applications 325 and 330 may likewise be modified as they are routed over the load balancer 380, further complicating the correlating and stitching of corresponding transaction data generated for the transaction (e.g., based on monitoring by agents 355, 360). Stitching utilizing standard, or default, stitching criteria can also be hampered in other situations and architectures, such as in transactions involving advanced threading and thread pools, transactions or transaction fragments that use proprietary or other non-standard protocols (or customized deviations from standard protocols) with proprietary fields and header formats, etc., among other examples.

Figure 5:
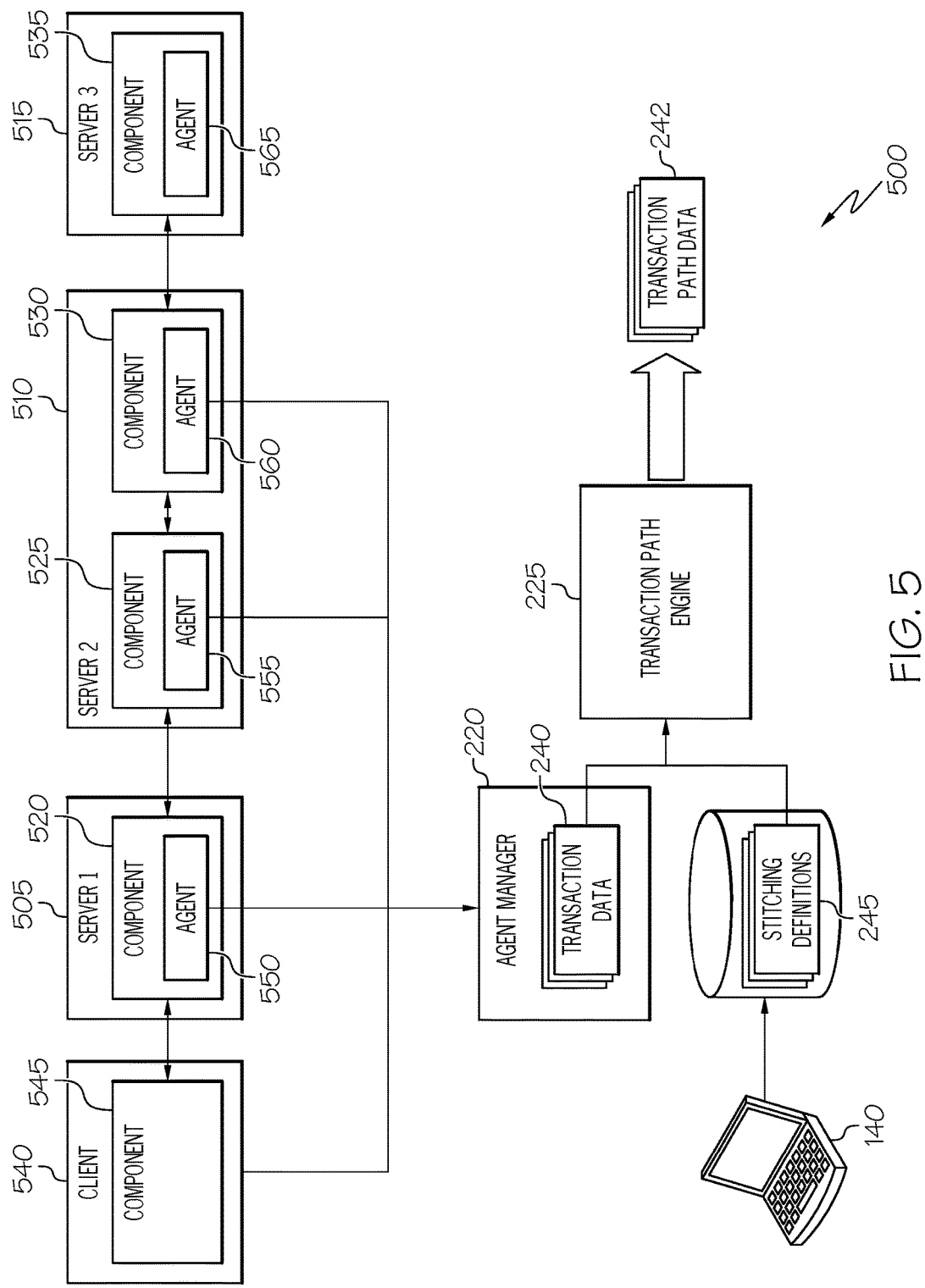
FIG. 5 is a simplified block diagram illustrating the example determination of flow paths for transactions observed in a system based at least in part on user-defined stitching definitions.

Turning to FIG. 5, a simplified block diagram 500 is shown illustrating the determination of flow paths for transactions observed in a system based at least in part on user-defined stitching definitions (e.g., 245). In this example, the software system can be a multi-tier system including multiple server devices (e.g., 505, 510, 515) each hosting a portion of the composite software components (e.g., 520, 525, 530, 535) of the system. Client systems (e.g., 540) can also be provided hosting other software components (e.g., 545), which may consume resources or services provided by servers 505, 510, 515. Agents (e.g., 555, 560, 565, 570) can be instrumented on one or more of the systems (e.g., 505, 510, 515) and/or software components (e.g., 550, 555, 560, 565) to monitor operation of and transactions involving the software components (e.g., 550, 555, 560, 565). Some software components (e.g., 545) involved in the transactions may be unmanaged, with no local agents monitoring the component (e.g., 545) directly.

In this example, transactions can be initiated by one or more client systems (e.g., 540). As the transactions take place, agents (e.g., 550, 555, 560, 565 (e.g., similar to the agents discussed above)) may monitor their respective software components and transactions (or transaction fragments) in which their software component participates and report information from the monitoring to an agent manager 220 for recording in transaction data 240. The transaction data may identify characteristics of the software components and/or threads involved in the transaction(s) as well as characteristics of messages (and their content) as sent during the transaction(s).

As illustrated in FIG. 5, transaction data 240 can be utilized (e.g., by a transaction path engine 225) to determine correlations existing between requests and responses and transaction fragments described in the transaction data 240. From the correlations, requests and responses can be determined for one or more transaction fragments and the transaction fragments can be determined to be part of a flow path of a corresponding transaction. As noted above, such relationships can be based on user-defined stitching definitions 245 defined for one or more types of transactions or transaction fragments (e.g., by a user using a user computing device (e.g., 140)). When it is determined or predicted that such a particular transaction or transaction fragment is described in a set of transaction data 240 to be processed by transaction path engine 225, a corresponding stitching definition can be selected (e.g., from a set or library of user-defined stitching definitions). The stitching definition can define one or more bases for determining correlations between requests and responses and/or between transaction fragments within a particular transaction. These correlations can be utilized by the transaction path engine 225 instead of or in addition to a standardized, or default, set of correlation criteria utilized generally for all other transaction fragments that do not have a corresponding user-defined stitching definition (e.g., 245). The transaction path engine 225 can generate transaction path data 242 to document the determined flow path for each transaction.

In one example, a particular stitching definition may be selectively used by a transaction path engine 225 in response to determining that a particular transaction fragment or involvement of a particular software component is described in a set of transaction data. For instance, a particular stitching definition may be defined to correspond to a particular transaction fragment that may appear in one or multiple different transactions. In another example, a set of one or more stitching definitions may be defined for a particular software component, whose transaction fragments inherently present difficulty to default stitching logic. Determining that a particular stitching definition is to be used can be based, for instance, on an identifier included in a request (e.g., from client 540 or another system component) initiating or orchestrating the initiation of a particular transaction that is to include a particular transaction fragment mapped to the particular stitching definition. In another example, a software component sending the request that is included in the particular transaction fragment can tag the request to identify that it is an instance of the particular transaction fragment and that a corresponding stitching definition is to apply. In yet another example, the type, content, source, and/or destination of a request can be interpreted to correspond to a request in the particular transaction fragment. In other cases, the particular stitching definition can be determined to be relevant based on the identification of a particular software component's involvement in a request or other portion of a transaction fragment described by the transaction data. Indeed, different transactions or transaction fragments may be identified by varied attributes described in the transaction data. When such a transaction fragment or software component is identified, however, a corresponding stitching definition can be identified and applied instead of or in addition to default stitching criteria by the transaction path engine 225 when grouping transaction data frames 240 and determining what other transaction data and transaction fragments correspond to the transaction fragment to which the user-defined stitching definition 245 applies. In still other examples, a user can select or define a particular stitching definition prior to and in connection with the initiation of a particular transaction and designate that the particular stitching definition is to be used for stitching one or more fragments of the transaction in this (and future instances) of the particular transaction, among other examples.

In some implementations, a transaction path engine may utilize one or many stitching definitions to complete the stitching of multiple transaction fragments into a flow path of a single transaction. In other cases, the transaction path engine may utilize a user-defined stitching definition for one of multiple transaction fragments in a transaction flow, and use default stitching criteria for other transaction fragments in the transaction. In still other cases, the transaction path engine 225 may stitch together an entire transaction flow of fragments without utilizing a single user-defined stitching definitions (i.e., and only using default stitching criteria of the transaction path engine 225).

Figure 6:
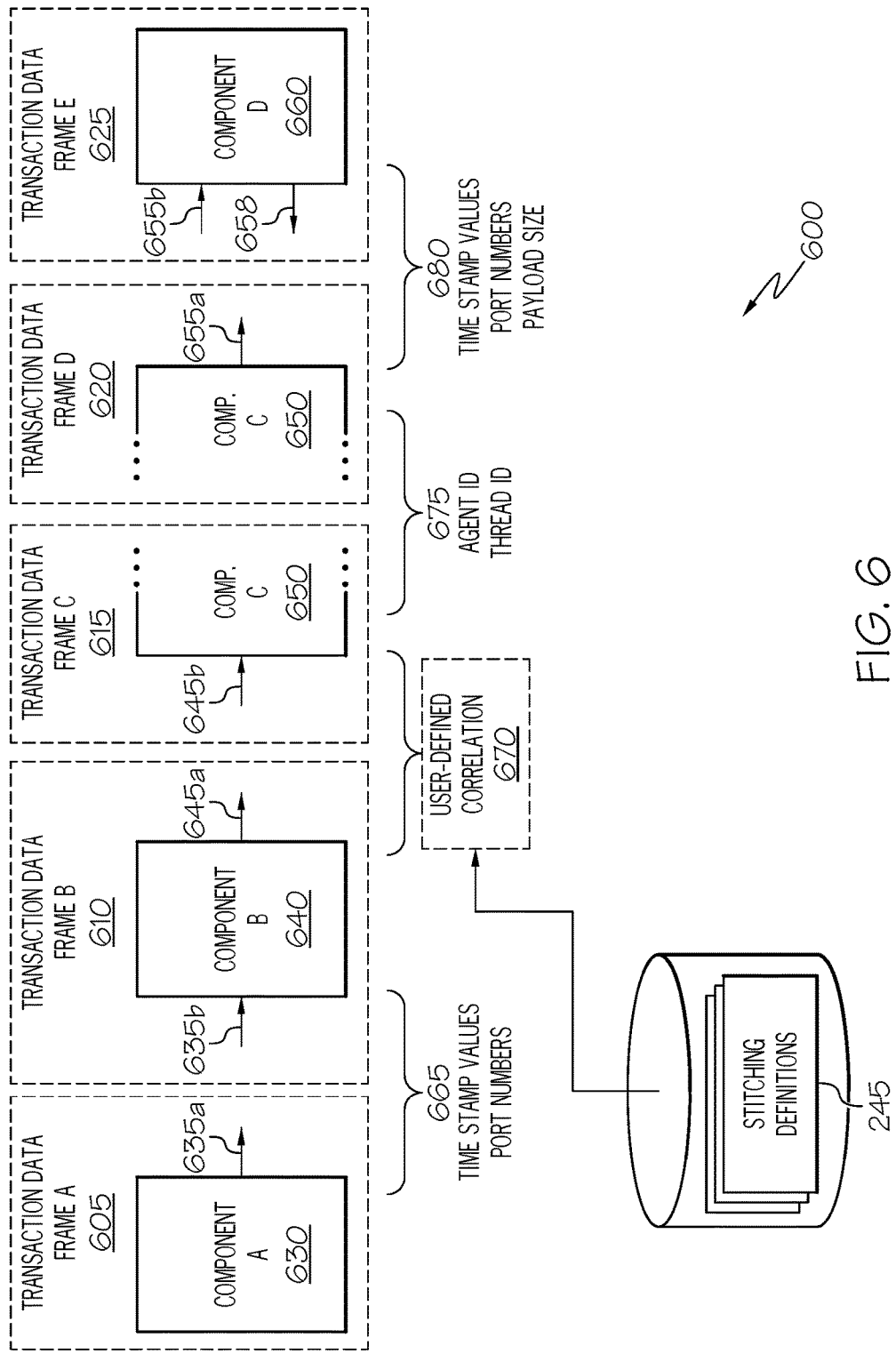
FIG. 6 is a simplified block diagram illustrating the example stitching of portions of an example transaction in accordance with at least one embodiment.

Turning to FIG. 6, a simplified block diagram 600 is shown illustrating the example stitching (e.g., by a transaction path engine of a transaction analysis system) of portions of a transaction based on determining correlations between pieces (or "frames") of transaction data (e.g., 605, 610, 615, 620, 625) included in a collection of a transaction data generated to document transaction monitoring (e.g., by one or more agents) in a system. In this example, Frame A 605 describes attributes and/or content of a request 635*a* sent by a software component 630. Frame B 610 describes attributes of a software component 635 including the receiving of a request 635*b* and sending of a request 640*a* in consecutive transaction fragments of a single transaction. Frame C 615 describes attributes of a single request 645*b* received by a software component 650, while Frame D 620 describes attributes of a request 655*a* sent by the same component 650, Component C. As another example, Frame E 625 describes both a request 655*b* received by a component 655, Component D, as well as a response 658 sent by Component D in response to the request 655*b*. In some cases, transaction data frames can describe the same quantum of transaction fragment information (e.g., for a single request or response, a request and corresponding response by the same component, an incoming request and any related outgoing requests of a single software component (i.e., sent in connection with generating a response to the incoming request), among other examples. In other cases, such as illustrated in the example of FIG. 6, transaction data frames (e.g., 605, 610, 615, 620, 625) can potentially carry varying amounts of information describing different portions of a transaction (e.g., a full transaction fragment, a single request or response, etc.).

As illustrated in the example of FIG. 6, correlations (e.g., 665, 670, 675, 680) can be determined by assessing attributes and/or content of requests and/or responses (e.g., 635*a,b*, 645*a,b*, 655*a,b*, 658, etc.) described in the transaction data to determine that the portions of the transactions described in various transaction data frames (e.g., 605, 610,

615, 620, 625) are related and describe the same transaction. Further, the bases of these correlations 665, 670, 675, 680 may also be varied (while in other instances, similar or the same correlations bases or criteria can be applied across transaction data for an entire transaction flow). For instance, a correlation 665 can be determined between Frame A 605 and Frame B 610 based on determining similarities between the request 635*a* sent by Component A and the request 635*b* received by Component B. For instance, a correlation can be determined between the described request instances 635*a,b* based on time stamp values described for the respective requests and port numbers (e.g., of the source and/or destination of the requests 635*a,b*). Accordingly, based on the correlation 665, the requests 635*a,b* described in Frames A and B can be determined to be the same request in a particular transaction.

User-defined stitching definitions 245 may utilized to determine correlations between other transaction information in the transaction data. For instance, a particular stitching definition can be defined for instances of a particular type of request that are sent from software Component B (640). In the example of FIG. 6, transaction data can be searched to discover that a particular transaction data frame (e.g., 610) describes an instance of the particular type of request (e.g., 645*a*) from Component B 640. Accordingly, in response to detecting the request 645*a*, the particular stitching definition can be selected and utilized to determine a corresponding user-defined correlation 670 between a value (e.g., a particular value in a particular field or the payload of the request 645*a*) as sent from Component B and another value as received by a receiving software component (e.g., Component C 650), among wide ranging alternative examples of user-defined correlations. The user-defined correlation 670 can differ from correlations (e.g., 665, 675, 680) determinable from a default set of stitching criteria utilized by a transaction analysis system. On the basis of the user-defined correlation 670, the requests 645*a,b* described in frames 610, 615 can be determined to be the same request in a transaction. Further, request 645*a,b* can be further related to request 635*a*, based on Frame B (610) defining a relationship between requests 635*b* and 645*a* as being requests of fragments in the same transaction, among other examples. Further, as shown in the example of FIG. 6, a mix of standard or default correlation criteria and user-defined correlation criteria (embodied in a stitching definition 245) can be utilized to complete the stitching of a transaction and determination of a transaction flow path.

Continuing with the particular example of FIG. 6, remaining correlations (e.g., 675, 680) can be determined. For instance, Frames C and D (615, 620) describing the same component 650, Component C, may be stitched by virtue of the frames 615, 620 being generated by the same agent (e.g., sharing the same agent identifier) as well as (or alternatively) describing that the observed request 645*b* initiated a particular thread (also observed by an agent) and identifying that the same particular thread resulted in the generation of the request 655*a* described in Frame D 620. The request 655*a* can also be determined to be part of the transaction that includes requests 635*a,b* and 645*a,b*. Further, a correlation can be determined between the request 655*a* described in Frame D (620) and request 655*b* described in Frame E (625) by determining a satisfactory correlation between each of the time stamp values, port numbers, and payload sizes of the requests 655*a,b* described in the respective frames 620, 625. Accordingly, the same request (i.e., 655*a,b*) can be determined to be described in each of Frame D (620) and Frame E (625). Likewise, based on the Frame E (625) identifying that response 658 is responsive to request 655*b*, response 658 can also be determined to be part of a transaction fragment of the same particular transaction. Additional such correlations can be further determined from additional transaction data frames (not shown), such as correlations between responses described in various transaction data frames sent in response to the requests 635*a,b*, 645*a,b*, 655*a,b* (e.g., from Component D to Component C to Component B to Component A). Further, a root of the transaction (e.g., request 635*a* from Component A) and one or more leaves (e.g., Component D) of the transaction can be determined through further analysis of the transaction data, such as set forth elsewhere herein. Upon completing these correlations and determining the composite transaction fragments (e.g., request-response pairs between components) and the order of these transaction fragments within the transaction, a transaction flow path can be determined and described in corresponding transaction path data.

Figure 7A:
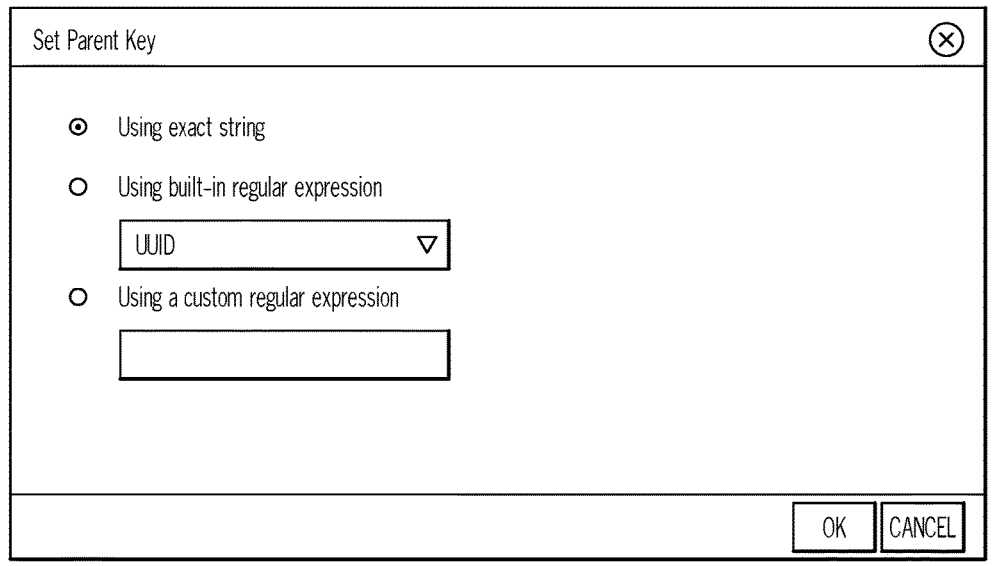
FIGS. 7A-7B illustrate example graphical user interface (GUI) windows for use in generating user-defined stitching in accordance with at least one embodiment.
Figure 7B:
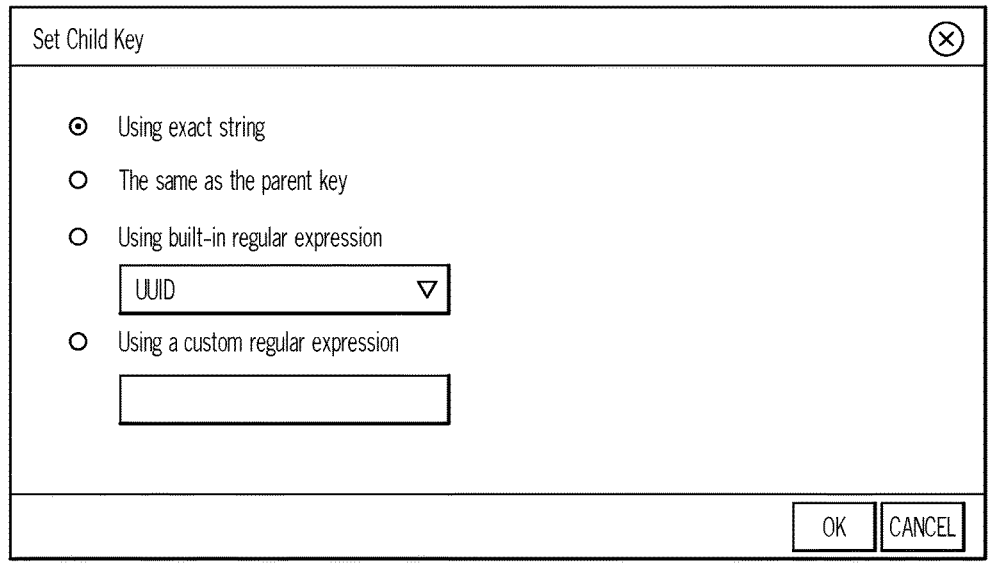

Turning to FIGS. 7A-7B, partial screenshots of example graphical user interface (GUI) windows 700*a*-700*b* are shown illustrating an example of a graphical user interface for use in generating user-defined stitching definitions. For instance, as shown in FIG. 7A, definition of a correlation or correlation criteria of a user-defined stitching definition can involve a user defining a parent key value, or the value to be expected in the sending component's request (or response). As shown in FIG. 7B, a user may then define the corresponding child key value, or value to be expected in the request (or response) as received by the receiving component. In one example, the stitching definition GUI can provide various options for the parent and key values, whereon at least one of the user-defined correlations are to be based. For instance, a user can define a particular string value that is to be found in content (e.g., a header field or payload) of the request (or response). Alternatively, a user may select from a set of built-in regular expressions corresponding to known fields or values that may be utilized in a proprietary request (or response), such as a unique user identifier (UUID) value. In other instances, a user may utilize the stitching definition GUI to define a custom regular expression for a particular proprietary value expected to be used in a request (or response). A corresponding child key can be defined (e.g., utilizing GUI window 700*b*) to define what value(s) appearing in a request (or response) as it enters the receiving component are to be considered as corresponding to the defined parent key value (e.g., defined through GUI window 700*a*) as it exits the sending component. Accordingly, a user can define one or more parent and child key pairs for one or more values expected in a request (or response) sent between components. Indeed, multiple parent/child key pairs may be allowed to serve as the basis (or alternative bases) for a user-defined correlation. In some cases, the defined child key value will be identical to the defined parent key value. In other cases, the defined child key value will differ from the defined parent key value. In still other examples, a user-defined stitching definition can define how a child key value can differ from the parent key value, but still be considered corresponding to the parent key value. For instance, one or more characters may be common between a parent key value and a corresponding child key value. In another example, a formula or algorithm can be defined to express a transform from the parent key value to the corresponding child key value, among other examples.

By way of illustration, one example of using an exact string as the basis of a parent/child key forming the basis of at least one criteria of a user-defined stitching definition may be according to:

```
<stitching parent="/state/sessionId/19246B42C5B33679CBB9D801CC8AE2"
    child="/reg/6c246B42C5B33679CB8239D801CC8A19" />
``` where a particular value (e.g., "19246B . . . ") appearing potentially anywhere in the request (or response) at the sending component is to map to a different value (e.g., "6c246B . . . ") appearing potentially anywhere in the request (or response) at a receiving component. In other cases, the parent/child key may be defined as an exact string where the value of the child key is to be the same as the parent key, such as in:

```
<stitching parent="/state/sessionId/19246B42C5B33679CBB9D801CC8AE2"
    child="/reg/{PARENT_KEY}" />
```

In another example, various pre-defined (and, in some cases, previously user-defined) regular expressions can be selected to define a particular parent/child key for a user-defined stitching definition. Such regular expression types may include such examples as described in Table 1 below (among potentially others):

| Name | Expression |
|---|---|
| Universal Resource Locator (URL) | ^(https?\|ftp\|file\|ldap)://[-A-Za-z0-9+&@#/%?=~_\|!:,.;]*[-A-Za-z0-9+&@#/%=~_\|]$ |
| Email | ^([a-z0-9_\.-]+)@([\da-z\.-]+)\.([a-z\.]{2,6})$ |
| Globally Unique Identifier (GUID) | [A-Fa-f0-9]{32}$\|^({\|()?[A-Fa-f0-9]{8}-([A-Fa-f0-9]{4}-){3}[A-Fa-f0-9]{12}(}\|))?$\|^({)?[0xA-Fa-f0-9]{3,10}(,{0,1}[0xA-Fa-f0-9]{3,6}){2}, {0,1}({)([0xA-Fa-f0-9]{3,4}, {0,1}){7}[0xA-Fa-f0-9]{3,4}(}})$ |
| IPv4 Address | ^(?:(?:25[0-5]\|2[0-4][0-9]\|[01]?[0-9][0-9]?)\.){3}(?:25[0-5]\|2[0-4][0-9]\|[01]?[0-9][0-9]?)$ |
| IPv6 Address | ^([0-9a-fA-F]{1,4}:){7}([0-9a-fA-F]){1,4}$ |
| Limited Length String | ^[A-Za-z0-9_-]{6,16}$ |

For instance, a particular parent/child key can be defined on the basis of a GUID regular expression such as:

```
<stitching parent="/state/sessionId/{GUID}"
    child="/reg/{PARENT_KEY}" />
``` where the GUID value of the child key is to match that of the parent key, among other examples (such as where the GUID of the child key only partially matches the GUID of the parent key).

Further, a custom-defined regular expression can be generated and utilized as the basis of a particular parent/child key, such as in the following example:

```
<stitching parent="/state/sessionId/[A-Za-z0-9-]{9, 12}"
    child="/reg/{PARENT_KEY}" />
``` where "/state/sessionId/" in these examples is the XML path within the repository of stitching definitions accessible to a particular transaction analysis system, among other example implementations.

In another example, a user-defined stitching definition GUI can be provided that allows a user to view a previously-recorded instance of a request (or response) described from both the view of a parent component and the view of a child component. Content of the request (or response), as viewed respectively by the parent and child components can be presented to the user and the user may interact with the displayed content presented from the parent's view and select a portion of the parent content and designate it as a parent key value, and likewise select a portion of the content from the child's view and designate it as the corresponding child key value to define a parent/child key pair for a stitching definition for a transaction fragment corresponding to the request (or response) presented in the GUI, among other example implementations.

Figure 8:
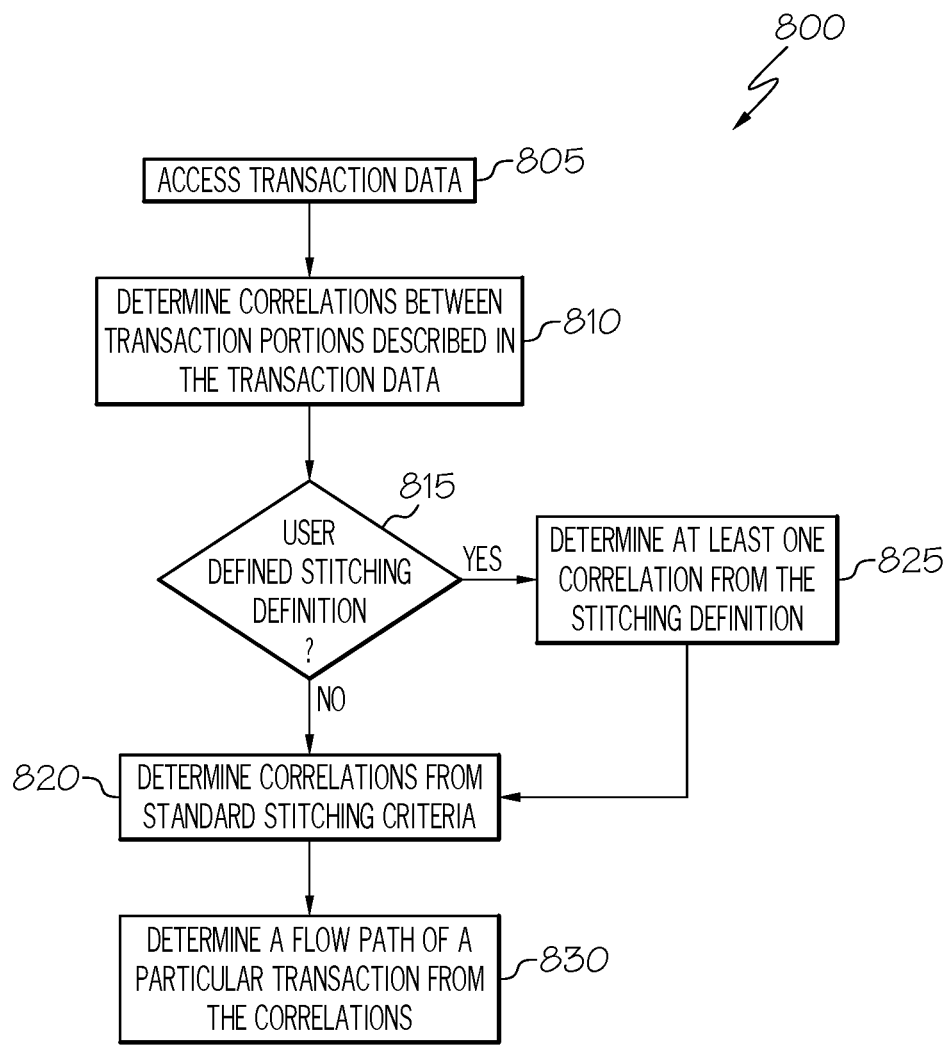
FIG. 8 is a flowchart illustrating example techniques for determining a transaction flow path based at least in part on a user-defined stitching definition in accordance with at least one embodiment.

FIG. 8 is a flowchart 800 of an example technique for determining a transaction flow path based at least in part on a user-defined stitching definition. For instance, transaction data can be received or otherwise accessed 805, which describes transactions involving a system of a multiple software component as observed during monitoring of the system (e.g., by a collection of agents instrumented on or between the software components). The transaction data can be embodied as frames of transaction data, each frame describing a respective portion of one of the transactions, together with attributes of the portion. A transaction portion can refer to any quanta of a single transaction and corresponding transaction data (or a corresponding transaction data frame) can describe attributes of that transaction portion as well as the attributes of one or more software components participating in that transaction portion. A transaction portion can include a single request or response. Indeed, a transaction portion can refer to the sending or the receiving of a single request or response. As an example, a first transaction portion described by a first transaction data frame may be the sending of a particular request by a first software component (the first transaction data frame describing attributes of the same), while a second transaction portion described by a second transaction data frame may be the receiving of the same particular request by a second software component (the second transaction data frame describing attributes of the receiving of this particular request), among other examples. Indeed, a transaction portion can embody multiple requests and/or responses sent and/or received by multiple software components, among transaction portions of other scopes. Overlaps, or correlations, between transaction portions described in various transaction data frames can be determined 810, based on commonalities in the attributes described in the transactions data. Correlations can be based on various attributes and criteria. User-defined stitching definitions can define user-defined correlation criteria. Such user-defined stitching definitions can be applied, in some cases, to all correlation attempts (e.g., as would any other correlation criteria). If no correlations can be determined using the user-defined stitching definition(s), other criteria can be utilized (e.g., at 820), such as standard or default stitching criteria (e.g., based on commonly occurring correlations based on attributes such as timestamps, requester/responder addresses, request/response size, etc.

In some instances, use of user-defined stitching definitions can be selective or conditional. For instance, it can be first be determined 815 (e.g., for a particular transaction portion described in a particular transaction data frame, or for a set of multiple transaction portions described in a set of transaction data frames) whether one or more user-defined stitching definitions are applicable. For instance, user-defined stitching definitions may be user- or system-specific and it may be undesirable or impermissible to utilize such stitching definitions in contexts not involving a corresponding users, entities (e.g., customers), or systems. In other instances, to make the application of user-defined stitching definitions and the overall analysis of transaction flows more economical and/or efficient, a particular one of a library of user-defined stitching definitions may be selectively applied only when it is determined that it is (or is likely to be) relevant to determining a correlation between one or more transaction portions described in a particular set of transaction data.

In either case, when user-defined stitching definitions are determined to be applicable to determining a correlation between transaction portions described in various transaction data frames, a correlation can be determined 825 based on criteria defined in a respective user-defined stitching definition. Where a user-defined stitching definition does not have applicability to a particular transaction portion, other stitching criteria can be applied to determine 820 correlations between the particular transaction portion and another. From the correlations determined (e.g., at 820 and/or 825) transaction portions (and corresponding transaction data) can be grouped and determined to each be a portion of a respective, specific one of the multiple transactions described in the transaction data. Further, the correlations can form the basis for determining an ordering of transaction portions (e.g., requests, responses, transaction fragments, etc.) within a corresponding transaction, from which a flow path of the transaction can be determined 830.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method for improving a computer transaction analysis system, the method comprising:

accessing transaction data describing a plurality of transactions involving a plurality of software components, wherein the transaction data is collected by agents instrumented on at least a portion of the plurality of software components, the transaction data comprises a plurality of transaction data frames, and each of the transaction data frames describes attributes of a respective portion of a corresponding one of the plurality of transactions;

detecting, using the data processing apparatus, a particular characteristic within a particular one of the plurality of transactions, wherein the particular characteristic is determined from the transaction data describing the particular transaction;

determining, using the data processing apparatus, that a user-defined stitching definition is to be used in lieu of a default stitching definition in determining a transaction path for the particular transaction, wherein the user-defined stitching definition is to be used to determine the transaction path for the particular transaction based on the particular characteristic, and transaction paths of one or more other transactions in the plurality of transactions are to be determined based on the default stitching definition;

determining, using the data processing apparatus, correlations between respective transaction portions of the particular transaction described in the plurality of transaction frames based on the described attributes, wherein a particular correlation between a first one of the transaction portions and a second one of the transaction portions is determined based on the user-defined stitching definition;

determining the transaction path of the particular transaction, using the data processing apparatus, based at least in part on the particular correlation determined between the first and second transaction portions, wherein the particular transaction comprises the first and second transaction portions, the first transaction portion is determined to immediately precede the second transaction portion in the transaction path of the particular transaction based on the determined particular correlation, and at least one of the transaction portions in the transaction path comprises a transaction portion hidden from a user during execution of the particular transaction; and generating a test case based on the transaction path to test correct operation of a subset of the plurality of software components participating in a test instance of the particular transaction.

2. The method of claim 1, wherein each transaction portion comprises one of a request sent from a respective requesting software component in one of the plurality of transactions, a request received at a respective responding software component in one of the plurality of transactions, a response to a corresponding request sent from a respective responding component in one of the plurality of transactions, and a response to a corresponding request received by a respective requesting component in one of the plurality of transactions.

3. The method of claim 1, further comprising determining that the first transaction portion and the second transaction portion comprise a common request sent within the particular transaction based on the particular correlation.

4. The method of claim 3, wherein the particular transaction comprises a plurality of transaction fragments, each transaction fragment comprises a respective request and a corresponding response to the respective request, and the method further comprises generating a graphical representation of the particular transaction comprising a plurality of graphical blocks each representing a respective software component involved in the particular transaction and a plurality of graphical connector elements each representing a respective one of the transaction fragments of the particular transaction, wherein a particular one of the plurality of graphical connector elements represents a particular one of the plurality of transaction fragments, the particular transaction fragment comprises the common request, the particular graphical connector element interconnects a first one of the plurality of graphical blocks representing a first one of the plurality of software components detected as sending the common request to a second one of the plurality of graphical blocks representing a second one of the plurality of software components detected as receiving the common request from the first software component in the particular transaction.

5. The method of claim 1, wherein the particular characteristic comprises involvement of a particular software component involved in the first particular transaction.

6. The method of claim 1, wherein the first transaction portion comprises a particular request by a particular one of the plurality of software components, and the particular characteristic comprises, the particular request being a request of a particular type.

7. The method of claim 1, wherein the first transaction portion comprises a particular request by a particular one of the plurality of software components, and the particular characteristic comprises, the particular request comprising particular content.

8. The method of claim 1, wherein the user-defined stitching definition comprises a defined parent-child key pair defining a basis for determining a correlation between transaction portions described in two transaction data frames.

9. The method of claim 8, wherein the parent-child key pair comprises a parent key value to be observed in content of a corresponding transaction portion at a software component sending the corresponding transaction portion, and the parent-child key pair further comprises a corresponding child key value to be observed in content of the corresponding transaction at a software component receiving the corresponding transaction portion.

10. The method of claim 1, wherein a default set of stitching criteria is used to determine other correlations between transaction portions described in the plurality of transaction frames based on the described attributes.

11. The method of claim 10, wherein correlations based on the default set of stitching criteria comprise correlations based at least in part on one of common timing attributes between transaction portions, common component addresses between transaction portions, and common payload sizes sent and received between software components.

12. The method of claim 10, wherein correlations between other transaction portions of the particular transaction are determined based on the default set of stitching criteria.

13. The method of claim 10, wherein determining a correlation using the default set of stitching criteria fails for the correlation between the first and second transaction portions of the particular transaction.

14. The method of claim 13, wherein determining a correlation using the default set of stitching criteria fails for the correlation between the first and second transaction portions based on presence of an intermediate routing process between two components participating in the particular transaction.

15. The method of claim 10, wherein determining the correlations between respective transaction portions described in the plurality of transaction frames comprises attempting to identify correlations based on any one of the default set of stitching criteria and the user-defined stitching definition.

16. A non-transitory computer readable medium having program instructions stored therein, wherein the program instructions are executable by a computer system to perform operations comprising:

receiving, from a plurality of agents instrumented on a plurality of software components, transaction data describing a plurality of transaction portions of a plurality of transactions involving the plurality of software components as observed by the plurality of agents, wherein the transaction data comprises a plurality of transaction data frames, and each of the transaction data frames describes attributes of a respective portion of a corresponding one of the plurality of transactions;

determining a particular characteristic of a particular one of the plurality of transactions, wherein the particular transaction comprises a first one of the transaction portions and a second one of the transaction portions, and the particular characteristic is determined from the transaction data describing the particular transaction;

determining that a user-defined stitching definition is to be used in lieu of a default stitching definition in determining a transaction path including the particular transaction, wherein the user-defined stitching definition is to be used to determine the transaction path for the particular transaction based on the particular characteristic, transaction paths of one or more other transactions in the plurality of transactions are to be determined based on the default stitching definition;

determining a particular correlation between the first transaction portion and the second transaction portion based on the user-defined stitching definition;

determining another correlation between another pair of transaction portions of the particular transaction based on the default stitching definition;

determining a transaction path of the particular transaction based at least in part on the determined particular correlation and the other correlation, and at least one of the transaction portions in the transaction path comprises a transaction portion hidden from a user; and generating a test case based on the transaction path to test correct operation of a subset of the plurality of software components participating in a test instance of the particular transaction.

17. A system comprising:

a data processor;

a memory;

a transaction path engine, executable to:
  access transaction data describing a plurality of transaction portions in a plurality of transactions involving a plurality of software components, wherein the transaction data comprises a plurality of transaction data frames, and each of the transaction data frames describes attributes of a respective portion of a corresponding one of the plurality of transactions;

determine a particular characteristic of a particular one of the plurality of transactions, wherein the particular transaction comprises a first one of the transaction portions and a second one of the transaction portions, and the particular characteristic is determined from the transaction data describing the particular transaction;

determine that a user-defined stitching definition is to be used in lieu of a default stitching definition in determining a transaction path for the particular transaction, wherein the user-defined stitching definition is to be used to determine the transaction path for the particular transaction based on the particular characteristic and transaction paths of one or more other transactions in the plurality of transactions are to be determined based on the default stitching definition;

determine a particular correlation between the first transaction portion and the second transaction portion based on the user-defined stitching definition; and determine a transaction path of the particular transaction based at least in part on the determined particular correlation, and at least one of the transaction portions in the transaction path comprises a transaction portion hidden from a user; and a test case generator to generate a test case based on the transaction path to test correct operation of a subset of the plurality of software components participating in a test instance of the particular transaction.

18. The system of claim 17, further comprising a plurality of agents instrumented on at least a portion of the plurality of software components, wherein at least a portion of the transaction data is based on monitoring of the plurality of transactions by the plurality of agents.

* * * * *